US012249302B2

(12) United States Patent
Haynes

(10) Patent No.: US 12,249,302 B2
(45) **Date of Patent: *Mar. 11, 2025**

(54) STRINGED INSTRUMENT BRIDGE

(71) Applicant: Evan Haynes, East Lyme, CT (US)

(72) Inventor: Evan Haynes, East Lyme, CT (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/083,023

(22) Filed: Dec. 16, 2022

(65) Prior Publication Data

US 2023/0178055 A1 Jun. 8, 2023

Related U.S. Application Data

(63) Continuation-in-part of application No. 17/342,036, filed on Jun. 8, 2021, now Pat. No. 11,568,838.

(Continued)

(51) Int. Cl.
*G10D 3/04* (2020.01)
*G10D 1/08* (2006.01)

(52) U.S. Cl.
CPC ................. *G10D 3/04* (2013.01); *G10D 1/08* (2013.01)

(58) Field of Classification Search
CPC .. G10D 3/04; G10D 1/08; G10D 3/00; G10D 1/00
See application file for complete search history.

(56) References Cited

U.S. PATENT DOCUMENTS 11,568,838 B2 * 1/2023 Haynes .................... G10D 3/04

* cited by examiner

*Primary Examiner* — Kimberly R Lockett

(74) *Attorney, Agent, or Firm* — Michael A Blake

(57) ABSTRACT

A stringed instrument bridge comprising: a bridge body; a receiving surface located on the bridge body; a first angled member abutting a first side of the receiving surface, the first angled member having a first angled surface with a first threaded hole; a second angled member abutting a second side of the receiving surface, the second side on an opposite side from the first side, the second angled member having a second angled surface with a second threaded hole; a plurality of saddles, each saddle configured to sit the receiving surface; a first wedge lock, the first wedge lock having a first slotted screw hole, the first wedge lock configured to attach to the bridge body at the first angled member via a first screw configured to engage the first slotted screw hole and the first threaded hole; a second wedge lock, the second wedge lock having a second slotted screw hole, the second wedge lock configured to attach to the bridge body at the second angled member via a second screw configured to engage the second slotted screw hole and the second threaded hole; where when the first and second wedge locks are loosely attached to the first and second angle members, the saddles may be adjusted into an adjusted position with respect to the receiving surface; and where when first screw is tightened and the second screw is tightened, the first and second wedge locks fixedly hold the saddles in the adjusted position. The invention also relates to a saddle for a stringed instrument bridge, the saddle comprising: a first threaded hole extending from the bottom side to the top curved surface on the first side of the peak; a second threaded hole extending from the bottom side to the top curved surface on the second side of the peak; the first threaded hole and the second threaded hole are both offset from the longitudinal centerplane and configured to allow tool clearance from and instrument string; and an unthreaded through hole from the first vertical planar surface to the second vertical planar surface, the unthreaded through hole having a domed shape; a retention wire threaded hole extending from the bottom side up into the bottom surface of the unthreaded through hole; a retention wire set screw configured to screw into the retention wire threaded hole and further configured to impinge a retention wire against the top surface of the (Continued)

unthreaded through hole; and the domed shape configured to center a retention wire over a retention wire set screw.

8 Claims, 21 Drawing Sheets

Related U.S. Application Data

(60) Provisional application No. 63/048,740, filed on Jul. 7, 2020.

STRINGED INSTRUMENT BRIDGE

CROSS-REFERENCES

This patent application is a continuation-in-part of patent application Ser. No. 17/342,036, by Evan Haynes, entitled "STRINGED INSTRUMENT BRIDGE", filed on Jun. 8, 2021, the entire contents of which are fully incorporated by reference herein. Patent application Ser. No. 17/342,036 claims priority to provisional patent application No. 63/048,740 filed on Jul. 7, 2020 by Evan Haynes, entitled "GUITAR BRIDGE", which provisional application is fully incorporated by reference herein.

TECHNICAL FIELD

The present invention relates to a stringed instrument bridge, and more particularly a stringed instrument bridge that is adjustable via wedge locks on the side of the stringed instrument bridge along with steps, saddles, and height adjusting set screws that can be used with a retention wire to make the saddles rigid with respect to the bridge body once the wedge locks are tightened down locking the saddles in place.

BACKGROUND

A number of adjustable bridges, both in string height and intonation, exist for both electric and acoustic stringed instruments. However, they use screws, cams, and other means to allow adjustment resulting in numerous components, screws and hardware. Often these components, screws and other hardware rattle, come loose or are otherwise ill fitting resulting in a loss of sustain, tone and clarity of notes on one or more strings along with extraneous noises.

Some bridges use a set screw that squeezes the saddles together in order to tighten loose saddles, but these bridges utilize many other components and hardware that can be ill fitting, rattle or otherwise come loose. Further, the set screw tends to push the alignment of the saddles off to one side resulting in misalignment of the saddles and strings relative to the neck, also known as lateral movement. The set screw also does not mechanically hold the saddles as solidly or rigidly as often desired. Another bridge uses adjustable cams for string height. However, the strings are not exposed over the top of the bridge and results in difficulties muting the strings with your palm while playing.

Thus there is a need for a stringed instrument bridge that overcomes the above listed and other disadvantages.

SUMMARY OF THE INVENTION

The invention relates to a stringed instrument bridge comprising: a bridge body; a receiving surface located on the bridge body; a first angled member abutting a first side of the receiving surface, the first angled member having a first angled surface with a first threaded hole; a second angled member abutting a second side of the receiving surface, the second side on an opposite side from the first side, the second angled member having a second angled surface with a second threaded hole; a plurality of saddles, each saddle configured to sit the receiving surface; a first wedge lock, the first wedge lock having a first slotted screw hole, the first wedge lock configured to attach to the bridge body at the first angled member via a first screw configured to engage the first slotted screw hole and the first threaded hole; a second wedge lock, the second wedge lock having a second slotted screw hole, the second wedge lock configured to attach to the bridge body at the second angled member via a second screw configured to engage the second slotted screw hole and the second threaded hole; where when the first and second wedge locks are loosely attached to the first and second angle members, the saddles may be adjusted into an adjusted position with respect to the receiving surface; and where when first screw is tightened and the second screw is tightened, the first and second wedge locks fixedly hold the saddles in the adjusted position.

The invention also relates to a saddle for a stringed instrument bridge, the saddle comprising: a first threaded hole extending from the bottom side to the top curved surface on the first s ide of the peak; a second threaded hole extending from the bottom side to the top curved surface on the second side of the peak; the first threaded hole and the second threaded hole are both offset from the longitudinal centerplane and configured to allow tool clearance from and instrument string; and an unthreaded through hole from the first vertical planar surface to the second vertical planar surface, the unthreaded through hole having a domed shape; a retention wire threaded hole extending from the bottom side up into the bottom surface of the unthreaded through hole; a retention wire set screw configured to screw into the retention wire threaded hole and further configured to impinge a retention wire against the top surface of the unthreaded through hole; and the domed shape configured to center a retention wire over a retention wire set screw.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION OF THE INVENTION

Figure 1:
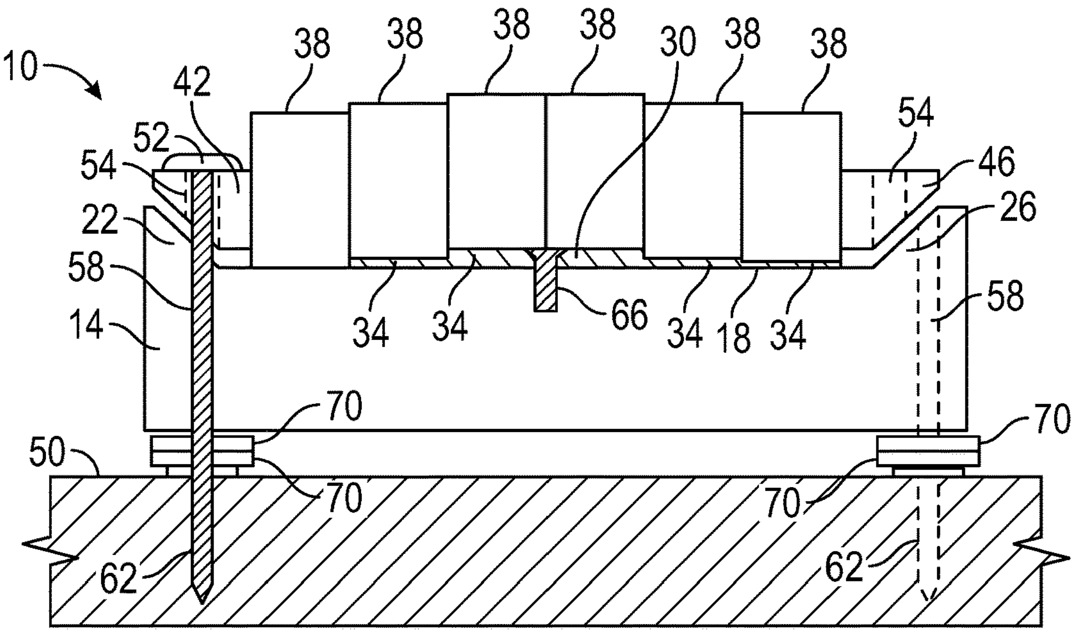
FIG. 1 is a front view sectional view of the disclosed stringed instrument bridge.

FIG. 1 is a front view of the disclosed stringed instrument bridge 10. The bridge comprises a bridge body 14. The bridge body 14 comprises a receiving surface 18 that is generally flat and horizontal. Abutting one side of the receiving surface 18 is a first angled member 22. Abutting the opposite side of the receiving surface 18 is a second angled member 26. Attached to the receiving surface 18 is a step block 30. The step block 30 may have a plurality of steps 34. A plurality of saddles 38 sits on the receiving surface 18 of step block 30. A first wedge lock 42 is configured to abut the first angled member 22, and a saddle 38. Similarly, a second wedge lock 46 is configured to abut the second angled member 26, and a saddle 38. In one embodiment, the wedge locks 42, 46 attach to the bridge body 14, and the guitar body 50 via a screw 52 through a screw hole 54 in the wedge lock, screw hole 58 in the bridge body 14, and screw hole 62 in the guitar body. Although a guitar and guitar body is discussed in this application, it should be noted that the stringed instrument bridge can be installed on many stringed instruments, including guitars, banjos, fiddles, violins, cellos, basses, and others. In addition, the stringed instrument bridge can be configured to work on stringed instruments with 6 strings, fewer strings, or more strings. In other embodiments, the bridge body 14 may be separately attached to the guitar body 50, and the wedge locks 42, 46 are attached to the bridge body via a screw that only needs to go through a wedge lock screw hole 54 and bridge body threaded screw hole 58. The wedge lock screw holes 54 are oversized to allow the wedge lock to have play prior to and while tightening the screw. Thus the wedge locks 42, 46 can be moved with respect to the angled members 22, 26 and saddles 38 before tightening the screws and will clamp the saddles tightly and rigidly together as the screws are tightened. The step block 30 may be attached to the bridge body 14 via a screw 66. Optional spacers 70 may be placed between the bridge body 14 and guitar body 50.

Figure 2:
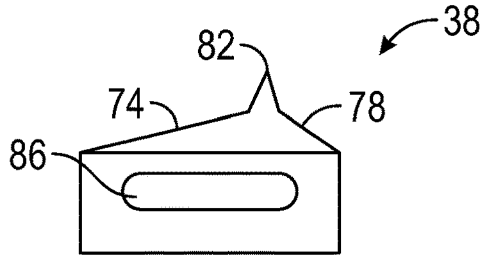
FIG. 2 is a side view of one of the saddles.

FIG. 2 is a side view of one of the saddles 38. Three sides of the saddle 38 have a rectangular shape. The top side of the saddle 38 has a shape comprising a first angled side 74, a second angled side 78, and a peak 82. A guitar string will generally lie across the peak 82. The saddle may have a through hole 86.

Figure 3:
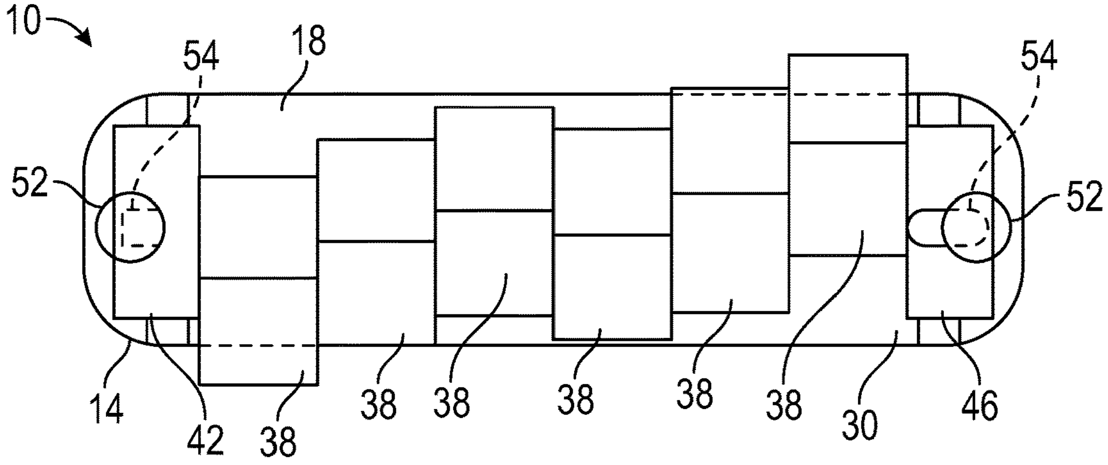
FIG. 3 is a top view of the stringed instrument bridge.

FIG. 3 is a top view of the stringed instrument bridge 10. In this view both screws 52 are inserted into the wedge lock screw holes 54, however, the screws are drawn see-through. As viewed from the top, the wedge lock screw holes 54 have an elongated, slotted or oval shape. This elongated, slotted, or oval shape of the wedge lock screw holes 54 allow the wedge locks 42, 46 to have freedom of movement in the direction of the long side of the oval before and during tightening of the screws 52 to clamp the saddles tightly and rigidly together. In other embodiments, the wedge lock screw holes 54 may have a rectangular shape, or any other suitable shape.

Figure 4:
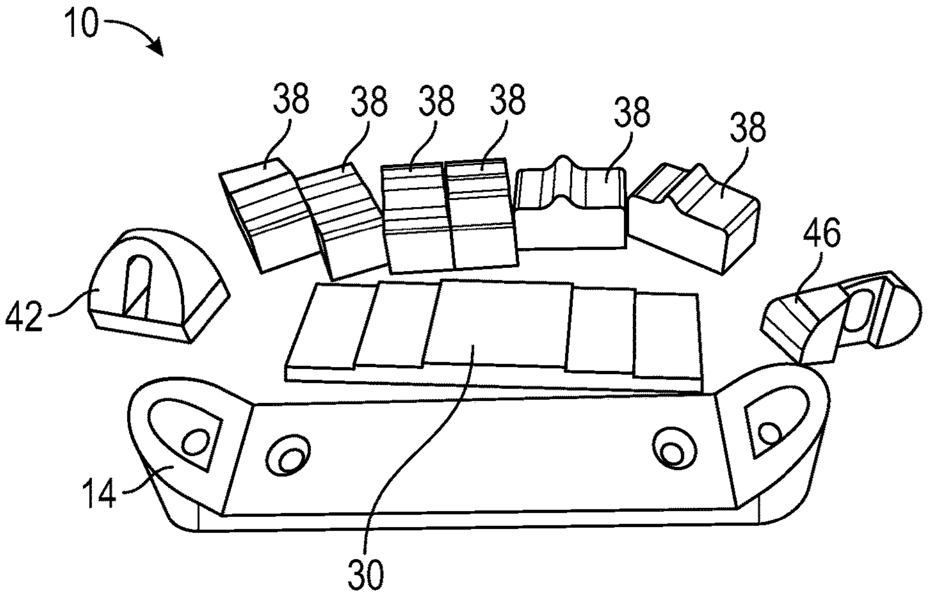
FIG. 4 is a perspective view of the pieces comprising the stringed instrument bridge.

FIG. 4 is a perspective view of the pieces comprising the stringed instrument bridge 10.

Figure 5:
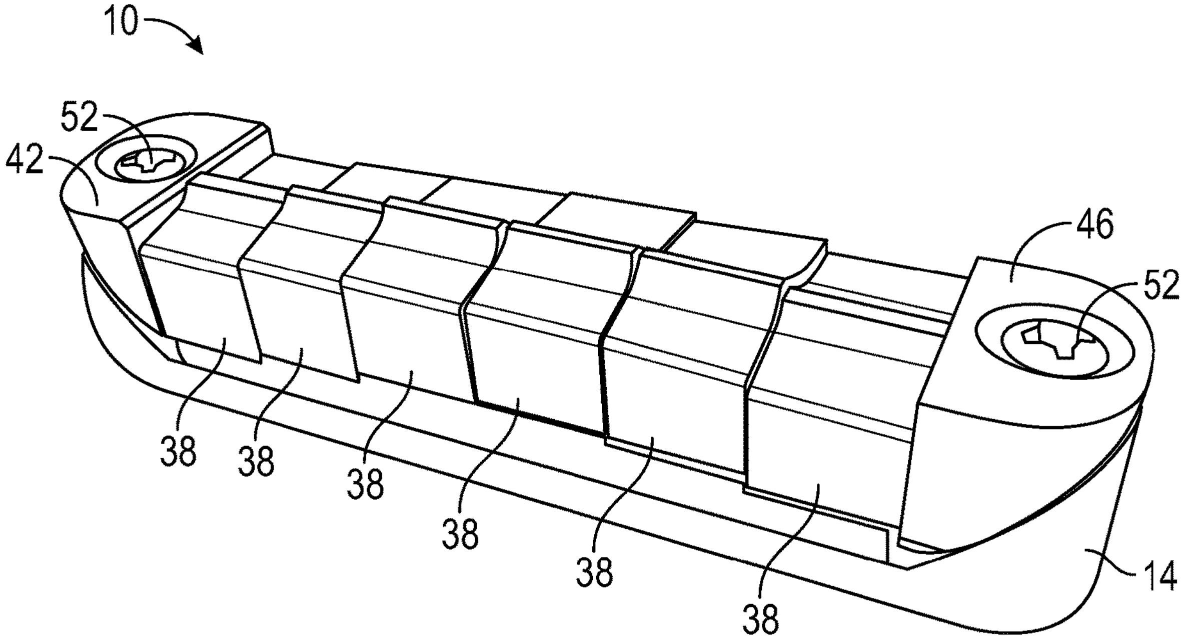
FIG. 5 is a perspective view of the pieces from FIG. 4 put together to form the stringed instrument bridge.

FIG. 5 is a perspective view of the pieces from FIG. 4 put together to form the stringed instrument bridge 10.

Figure 6:
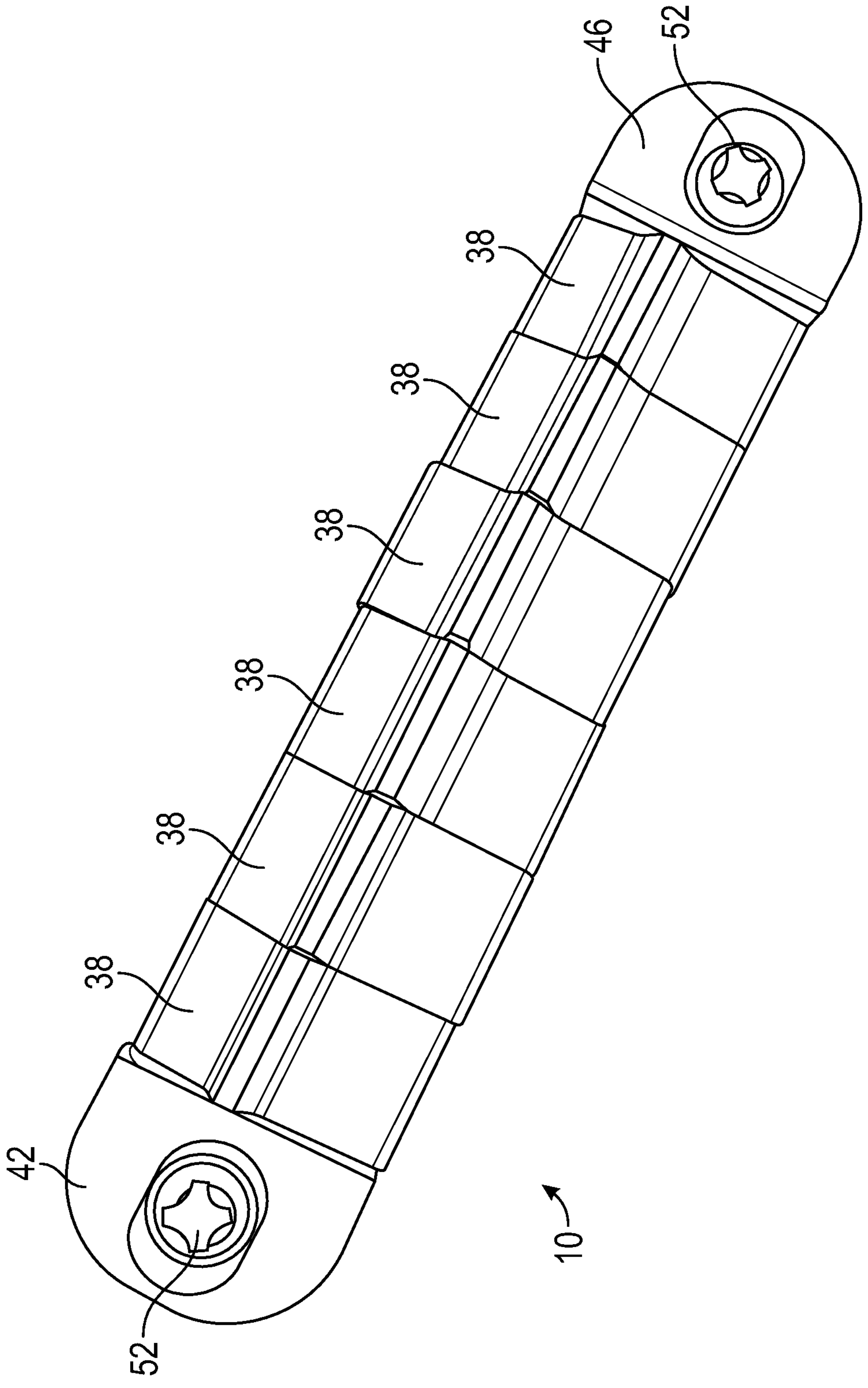
FIG. 6 is a top view of the stringed instrument bridge from FIG. 5.

FIG. 6 is a top view of the stringed instrument bridge 10 from FIG. 5.

Figure 7:
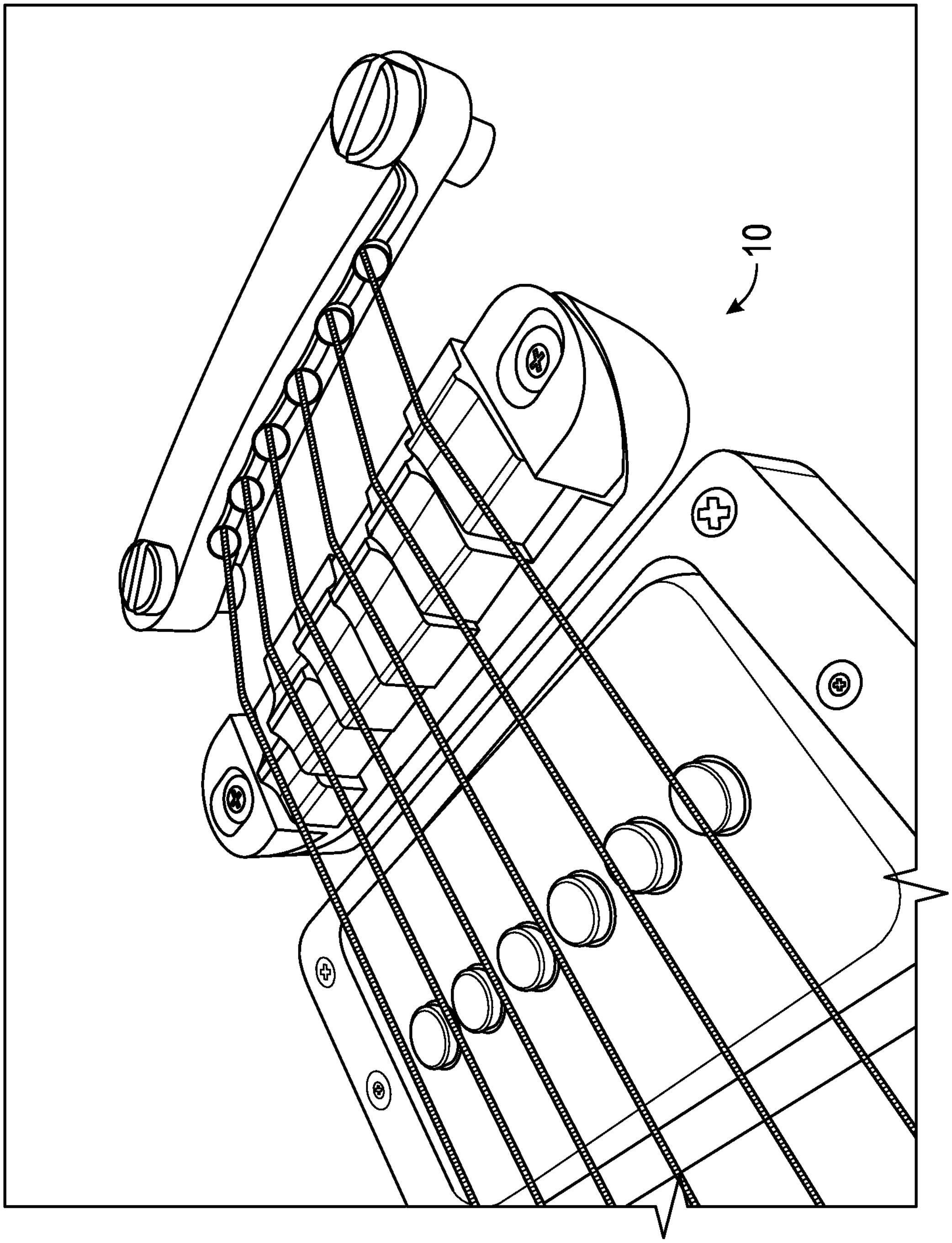
FIG. 7 is a perspective view of the stringed instrument bridge installed on a guitar.

FIG. 7 is a perspective view of the stringed instrument bridge 10 installed on a guitar.

Figure 8:
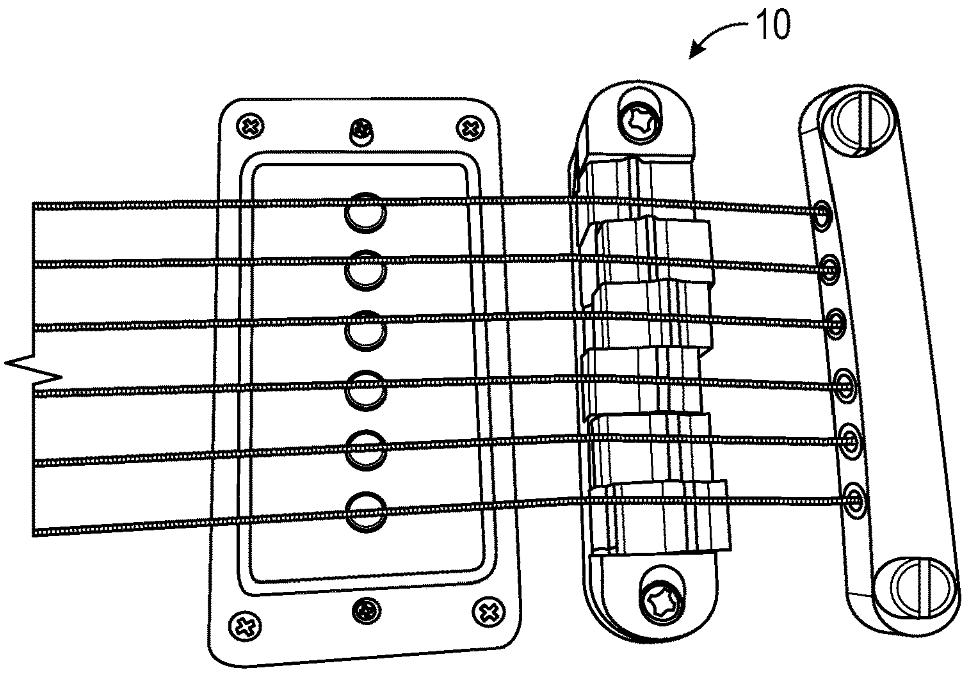
FIG. 8 is a top view of the stringed instrument bridge installed on a guitar.

FIG. 8 is a top view of the stringed instrument bridge 10 installed on a guitar.

Figure 9:
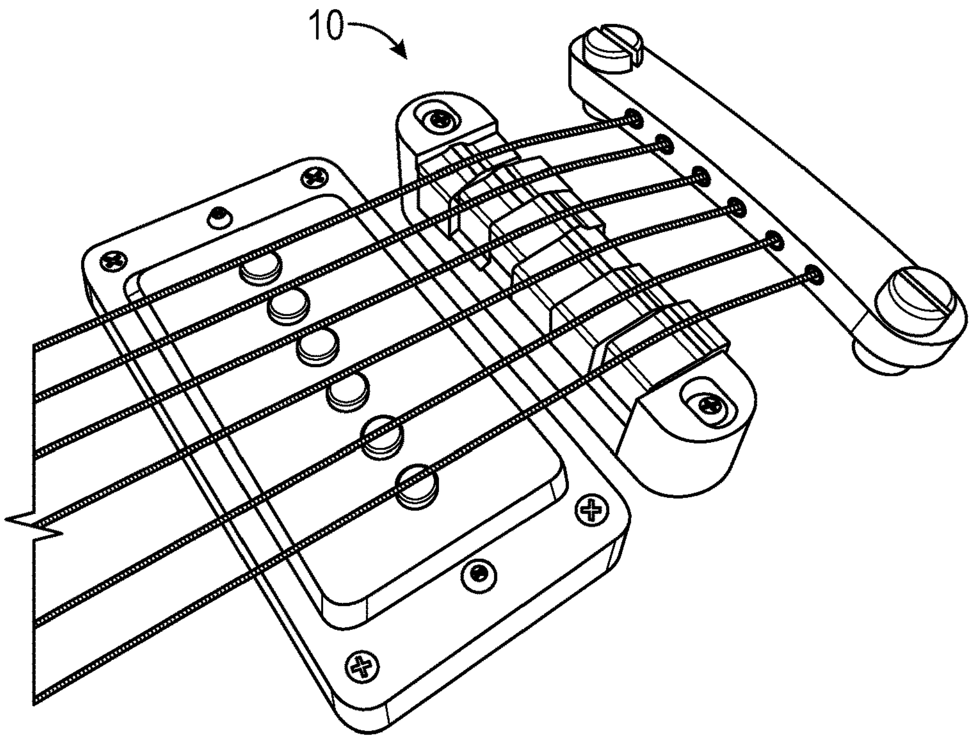
FIG. 9 is another perspective view of the stringed instrument bridge installed on a guitar.

FIG. 9 is another perspective view of the stringed instrument bridge 10 installed on a guitar.

Figure 10:
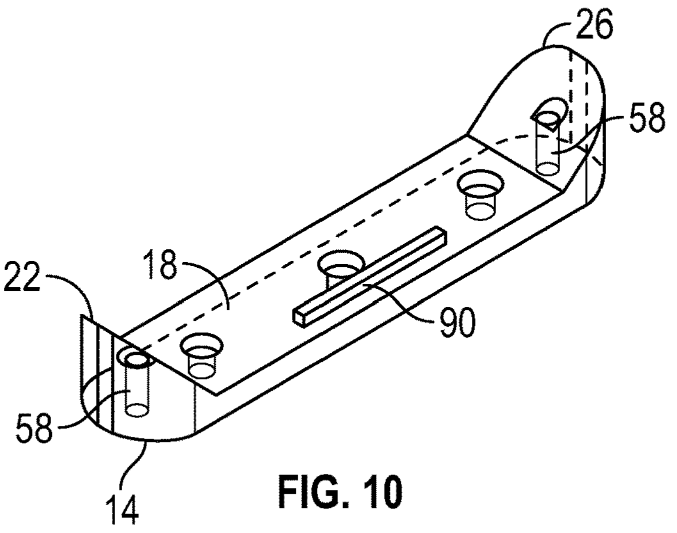
FIG. 10 is a perspective view of the bridge body.

FIG. 10 is a perspective view of the bridge body 14. In this view an optional location bar 90 is located on the receiving surface 18. The location bar 90 may extend out from the receiving surface, and thus acts as a guide for locating the placement of the step block on the receiving surface.

Figure 11:
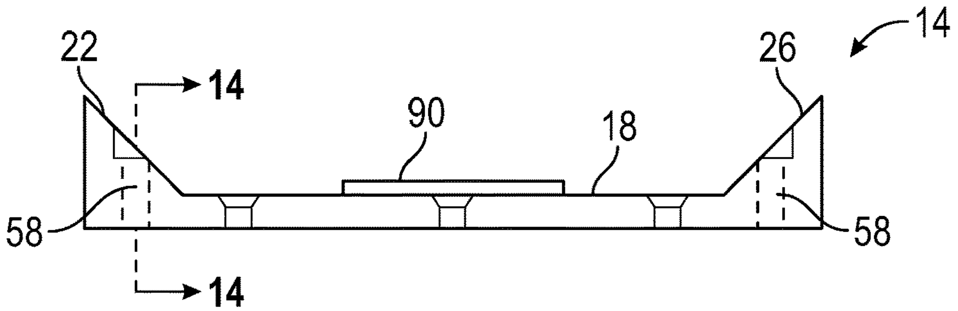
FIG. 11 is a front view of the bridge body.

FIG. 11 is a front view of the bridge body 14.

Figure 12:
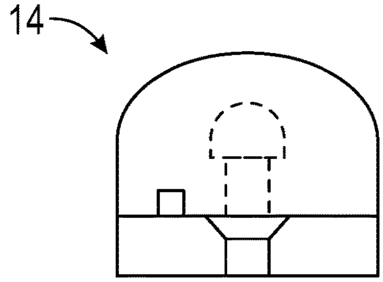
FIG. 12 is a side view of the bridge body.

FIG. 12 is a side view of the bridge body 14.

Figure 13:
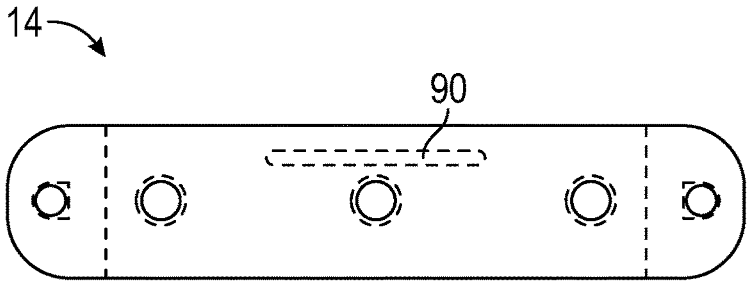
FIG. 13 is a top view of the bridge body.

FIG. 13 is a top view of the bridge body 14.

Figure 14:
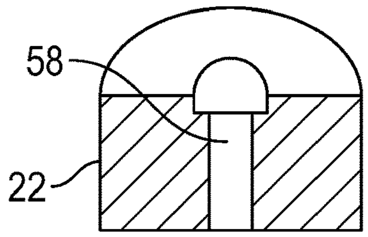
FIG. 14 is a sectional view of the first angled member.

FIG. 14 is a sectional view of the first angled member 22.

Figure 15:
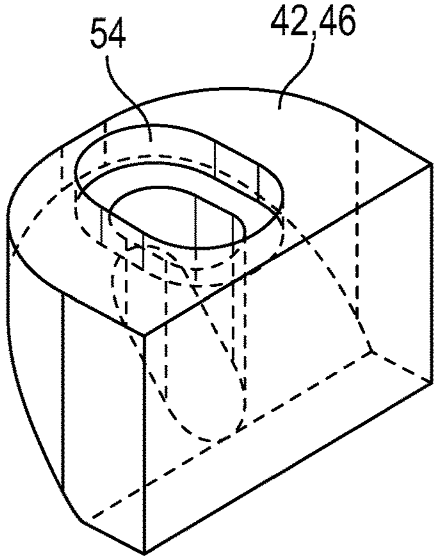
FIG. 15 is a perspective view of a wedge lock.

FIG. 15 is a perspective view of a wedge lock 42 and 46.

Figure 16:
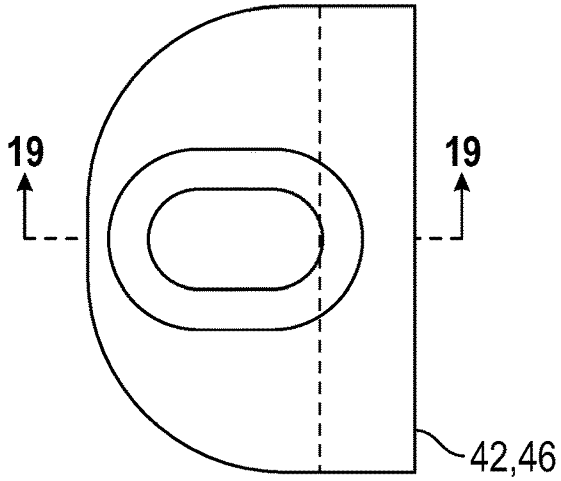
FIG. 16 is a top view of the wedge lock.

FIG. 16 is a top view of the wedge lock 42 and 46.

Figure 17:
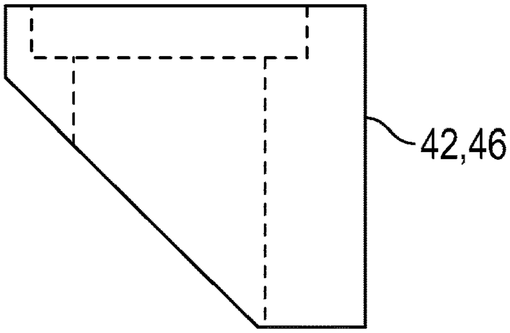
FIG. 17 is a front view of the wedge lock.

FIG. 17 is a front view of the wedge lock 42 and 46.

Figure 18:
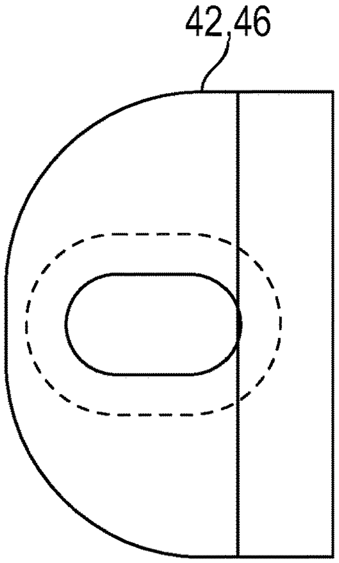
FIG. 18 is a bottom view of the wedge lock.

FIG. 18 is a bottom view of the wedge lock 42 and 46.

Figure 19:
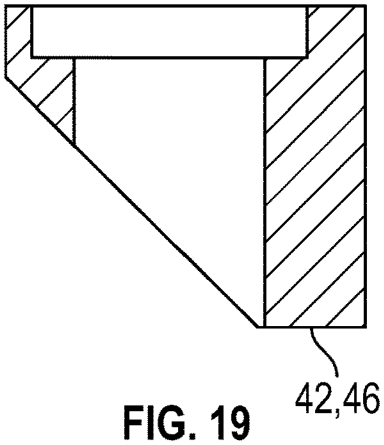
FIG. 19 is a cross-sectional view of the wedge lock.

FIG. 19 is a cross-sectional view of the wedge lock 42 and 46.

Figure 20:
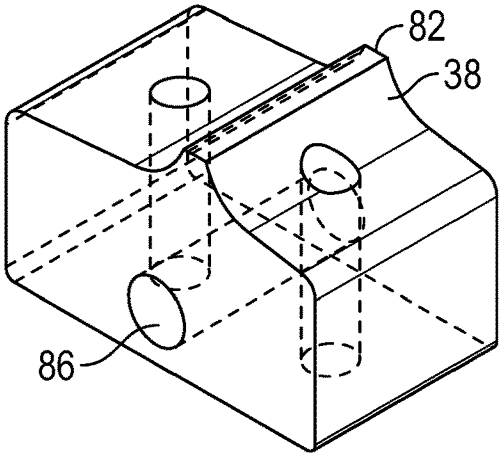
FIG. 20 is a perspective view of a saddle.

FIG. 20 is a perspective view of a saddle 38.

Figure 21:
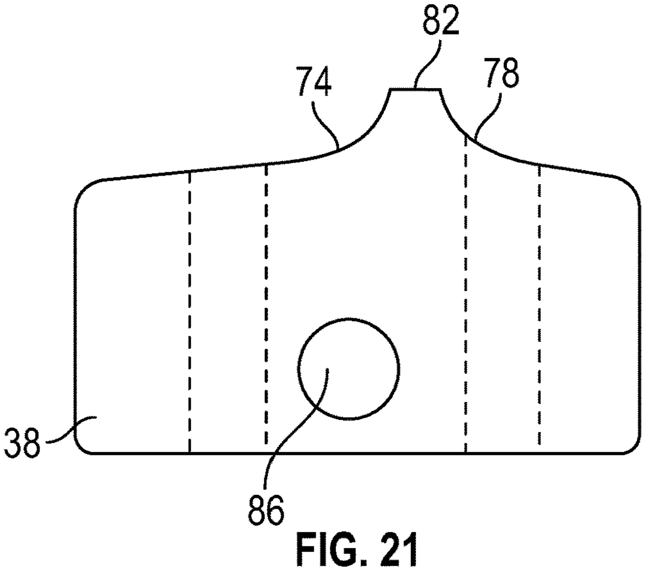
FIG. 21 is a front view of the saddle.

FIG. 21 is a front view of the saddle 38.

Figure 22:
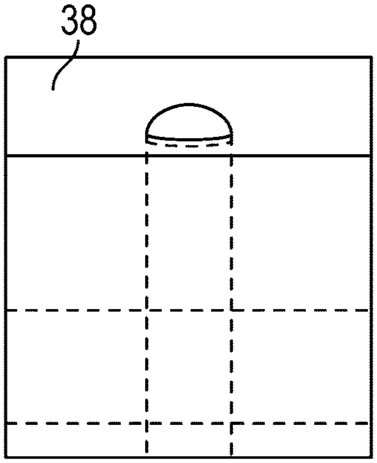
FIG. 22 is a side view of the saddle.

FIG. 22 is a side view of the saddle 38.

Figure 23:
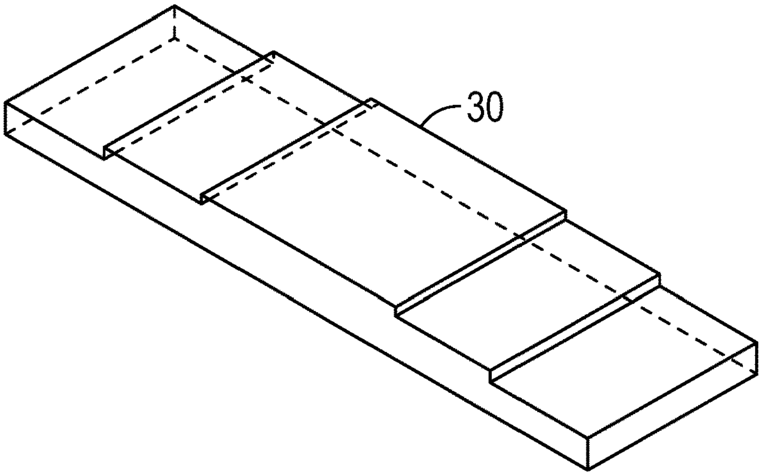
FIG. 23 is a perspective view of the step block.

FIG. 23 is a perspective view of the step block 30.

Figure 24:
FIG. 24 is a top view of the step block.

FIG. 24 is a top view of the step block 30.

Figure 25:
FIG. 25 is a front view of the step block.

FIG. 25 is a front view of the step block 30.

Figure 26:
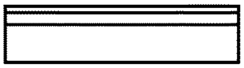
FIG. 26 is a side view of the step block.

FIG. 26 is a side view of the step block 30.

Figure 27:
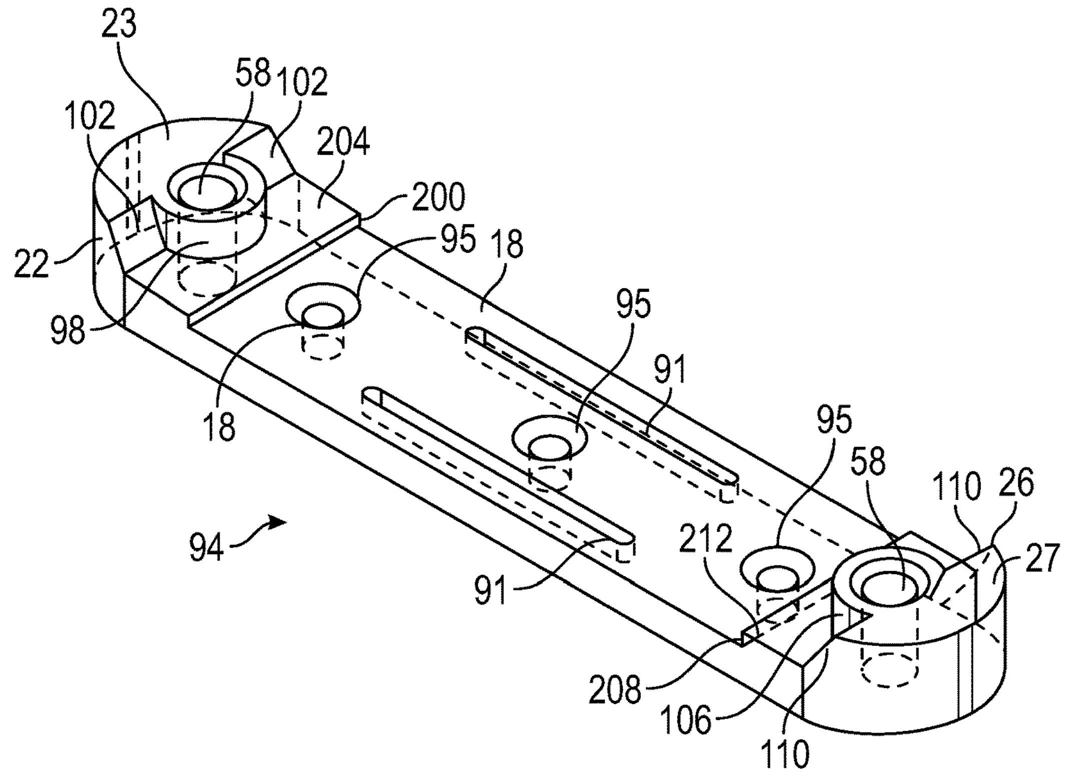
FIG. 27 is a perspective view another embodiment of the bridge body.

FIG. 27 is a perspective view another embodiment of the bridge body 94. Similar to the embodiment of FIGS. 10-14, the bridge body 94 comprises a receiving surface 18 that is generally flat and horizontal. The receiving surface 18 has three screw holes 95. These screw holes 95 may be used to attach the bridge body 94 to the guitar body 50 via screws. Abutting one side of the receiving surface 18 is a first angled member 22. Abutting the opposite side of the receiving surface 18 is a second angled member 26. However, in this embodiment, the first angled member 22 has a first bump out 98 that generally encircles the bridge body screw hole 58 located in the first angled member 22 while at the same time maintaining the availability of a portion of the angled surface 102 of the first angled member 22 for a wedge lock 154 (wedge lock 154 is discussed below) to abut and mate against. The bump out 98 allows for more threads in the bridge body screw hole 58 to make a stronger attachment with a screw 52. The first angled member 22 also has a first planar surface 23 that is parallel to the receiving surface 18. The first planar surface 23 is configured to abut and mate against a planar surface of the wedge lock 154. The first angled member 22 also comprises a first step 200 that forms a first step planar surface 204 that is parallel to the receiving surface 18. The first step planar surface 204 is configured to receive and mate with a planar surface on the wedge lock 154. Similarly, the second angled member 26 has a second bump out 106 that generally encircles the bridge body screw hole 58 located in the second angled member 26 while at the same time maintaining the availability of a portion of the angled surface 110 of the second angled member 26 for a wedge lock 154 to abut and mate against. The bump out 106 allows for more threads in the bridge body screw hole 58 to make a stronger attachment with a screw 52. In one embodiment the angled surfaces 102 and 106 may make an angle of about 60° with the receiving surface 18. The second angled member 26 also has a second planar surface 27 that is parallel to the receiving surface 18. The second planar surface 27 is configured to abut and mate against a planar surface of the wedge lock 154. The second angled member 26 also comprises a second step 208 that forms a second step planar surface 212 that is parallel to the receiving surface 18. The second step planar surface 212 is configured to receive and mate with a planar surface on the wedge lock 154. We talk about the horizontal planer surfaces of the top of the bridge body abutting, receiving and/or mating with the horizontal planer surfaces of the underside of the wedge lock. These surfaces 18, 204, 212, may only touch the planar surface on the wedge lock 154 if the wedge lock 154 is fully "bottomed out" or screwed all the way down. Many times, at least one wedge lock 154 will not be bottomed out because the wedge lock 154 is holding the saddles in place, and the wedge lock 154 may be above the surfaces 18, 204, 212. Many times there will be a small gap between the bottom of the wedge lock 154 and the surfaces 18, 204, 212 when everything is tightened down.

In this embodiment, the bridge body 94 has two location bar slots 91. In this embodiment, the two (2) location bar slots 91 are located on the receiving surface 18 and are parallel to each other. The location bar slots 91 are configured to receive a location bar 90 from the step block 118 discussed with respect to FIG. 35 below.

Figure 28:
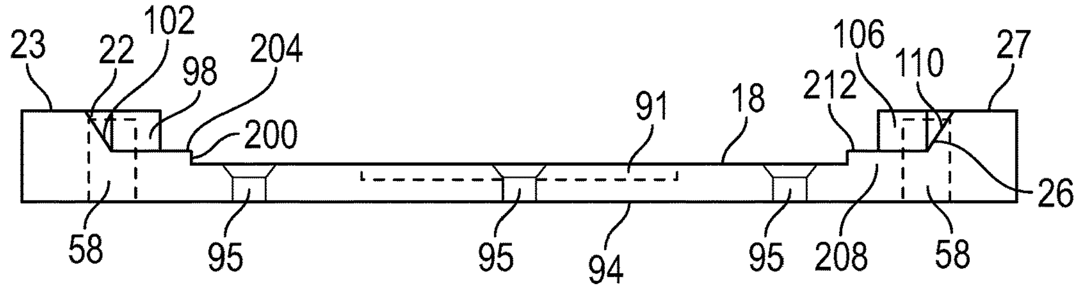
FIG. 28 is a front view of the bridge body from FIG. 27.

FIG. 28 is a front view of the bridge body 94 from FIG. 27.

Figure 29:
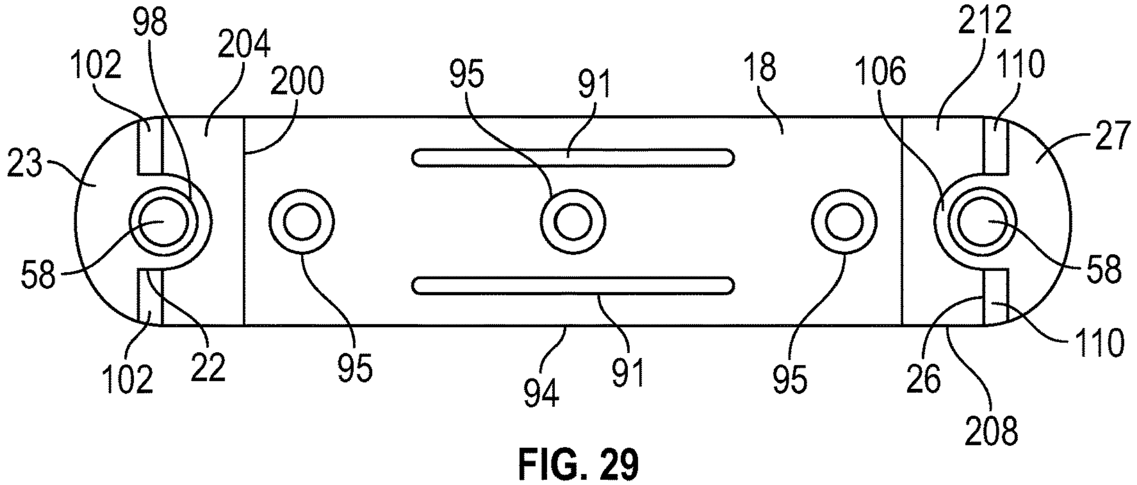
FIG. 29 is a top view of the bridge body from FIGS. 27 and 28.

FIG. 29 is a top view of the bridge body 94 from FIGS. 27 and 28.

Figure 30:
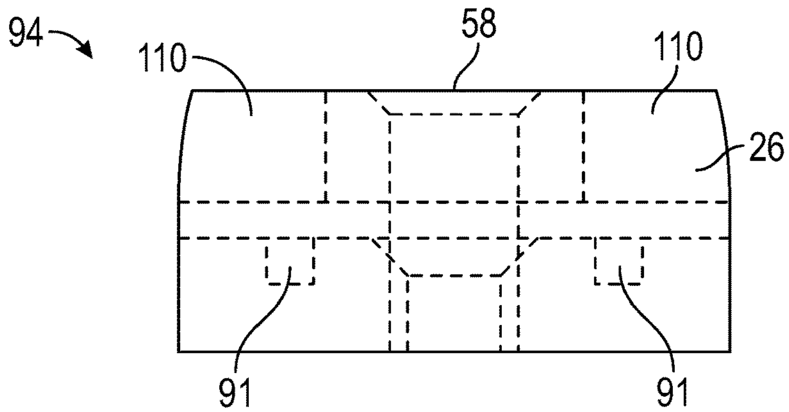
FIG. 30 is a side view of the bridge body from FIGS. 27, 28, 29.

FIG. 30 is a side view of the bridge body 94 from FIGS. 27, 28, 29.

Figure 31:
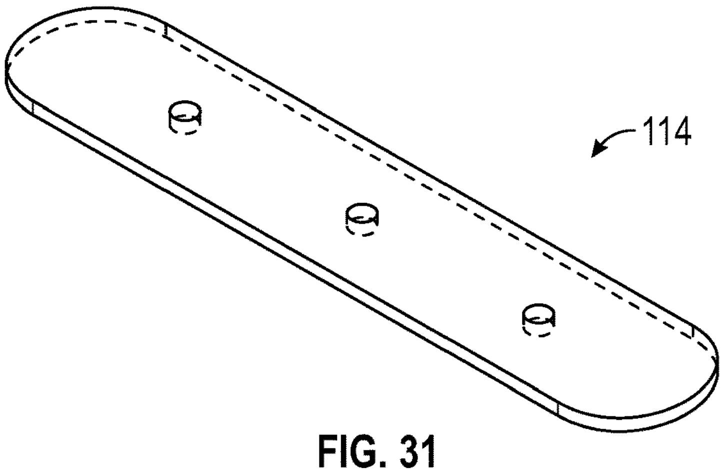
FIG. 31 is a perspective view of a height spacer.

FIG. 31 is a perspective view of a height spacer 114. The height spacer would be located between the bridge body 94 and the guitar body 50. One or more height spacers 114 may be used to properly locate the stringed instrument bridge with respect to the guitar body 50.

Figure 32:
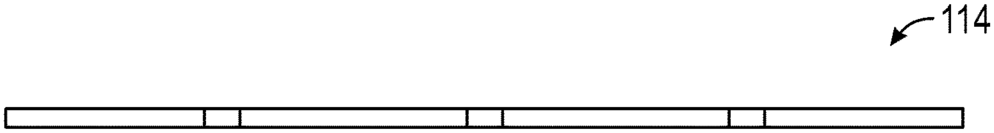
FIG. 32 is a front view of the height spacer from FIG. 31.

FIG. 32 is a front view of the height spacer 114 from FIG. 31.

Figure 33:
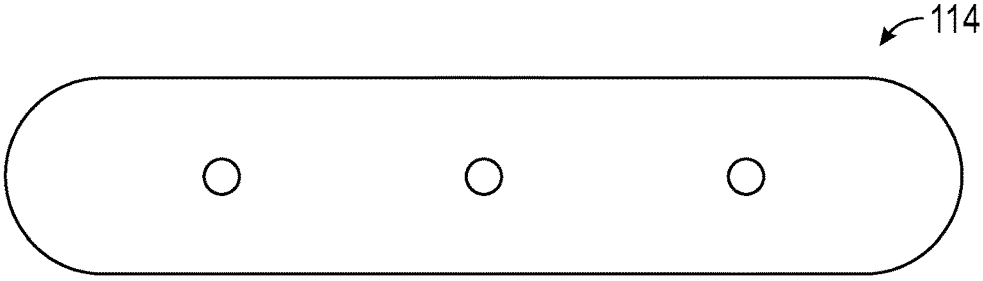
FIG. 33 is a top view of the height spacer from FIG. 31.

FIG. 33 is a top view of the height spacer 114 from FIG. 31.

Figure 34:
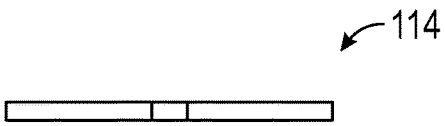
FIG. 34 is a side view of the height spacer from FIG. 31.

FIG. 34 is a side view of the height spacer 114 from FIG. 31.

Figure 35:
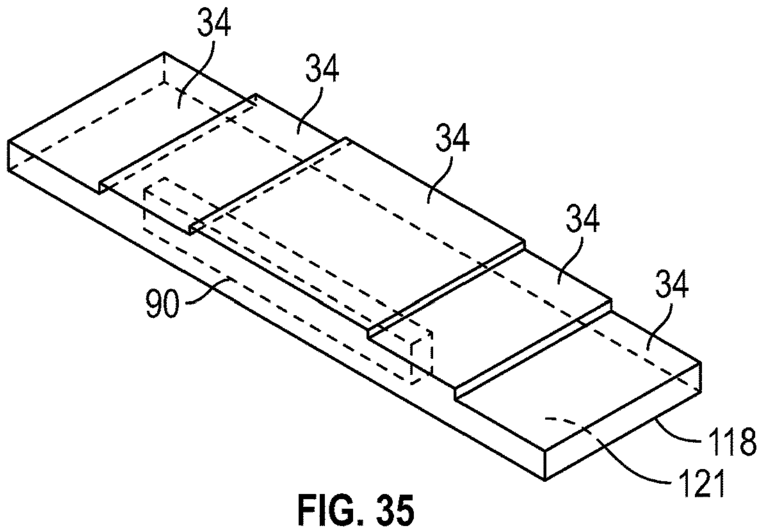
FIG. 35 is a perspective view of another embodiment of a step block.

FIG. 35 is a perspective view of another embodiment of a step block 118 with a plurality of steps 34. In this embodiment, the step block 118 has a location bar 90 extending from the bottom surface 121 of the step block 118. The location bar 90 is configured to slide into one of the location bar slots 91 in the bridge body 94. Thus, the location bar 90 inserted into one of the bar slots 91, fixes the position of the step block with respect to the bridge body 94.

Figure 36:
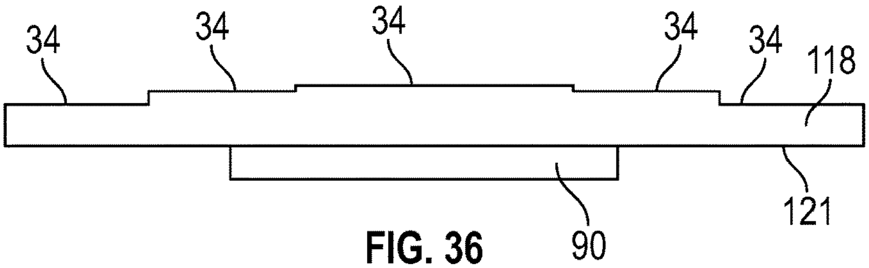
FIG. 36 is a front view of the step block from FIG. 35.

FIG. 36 is a front view of the step block 118.

Figure 37:
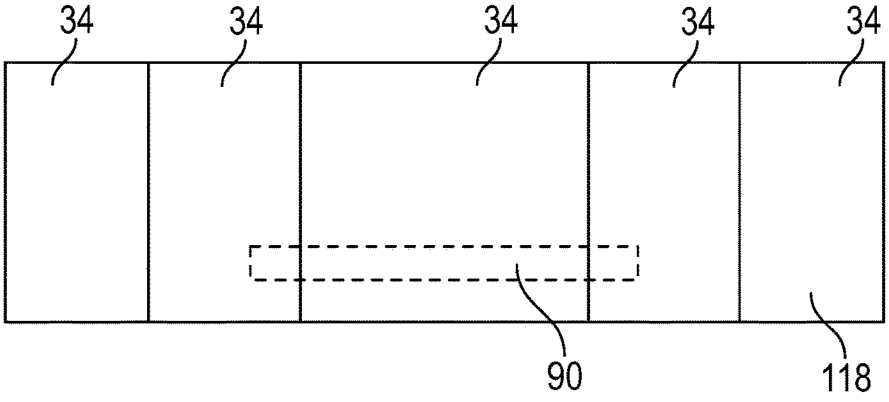
FIG. 37 is a top view of the step block from FIG. 35.

FIG. 37 is a top view of the step block 118.

Figure 38:
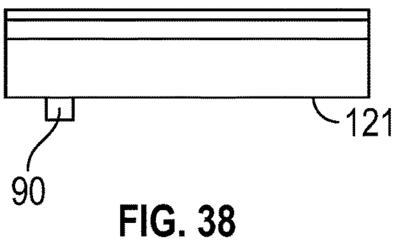
FIG. 38 is a side view of the step block from FIG. 35.

FIG. 38 is a side view of the step block 118.

Figure 39:
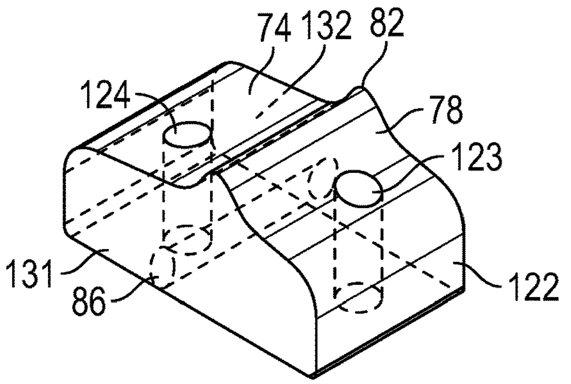
FIG. 39 is a perspective view of another embodiment of a saddle.

FIG. 39 is a perspective view of another embodiment of a saddle 122. The saddle comprises two threaded holes 123, 124. Through hole 86 is unthreaded. Two set screws can be installed into each threaded hole 123, 124 to make the height readily adjustable. The saddles can have hole 86 horizontally through them for the installation of a pipe cleaner or other cushioned wire to retain the saddles in case of string breakage and possible loose wedge locks. The saddle 122 also has a first vertical planar surface 131, and a second vertical planar surface 132. If the saddle 122 happens to be adjacent and abutting a wedge lock 154, one of the planar surfaces 131, 132 will be abutting against the wedge lock vertical planar surface 163; otherwise, the surfaces abut against adjacent saddles.

Figure 40:
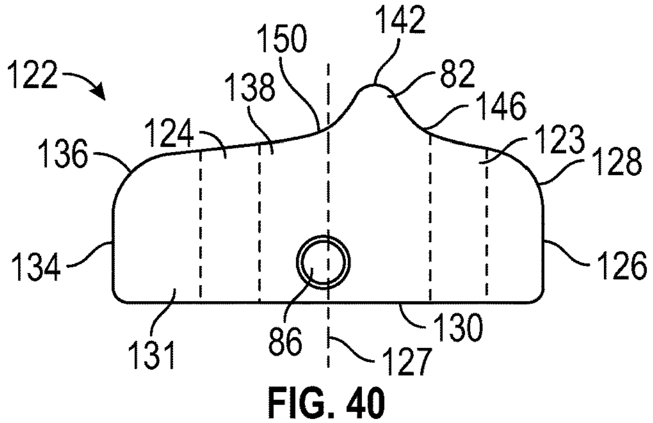
FIG. 40 is a front view of the saddle from FIG. 39.

FIG. 40 is a front view of the saddle 122. The saddle 122 has a right side 126, bottom side 130, left side 134, and a top side 138. Saddle 122 has a curved surface 128 between the top side 138 and the right side 126, and a curved surface 136 between the top side and left side 134. Similarly the peak 82 is curved at the top 142 of the peak 82. In addition, the surfaces 146, 150 between the peak and the top side are also curved. These curved surfaces 128, 136, 142, 146, 150 provide comfort to a user playing the guitar or other stringed instrument with the disclosed stringed instrument bridge installed. The curved surfaces 128, 136, 142, 146, 150 are much more comfortable than surfaces with sharp edges and angles. A guitar string will generally lie across the peak 82. The saddle 122 has an imaginary longitudinal centerplane 125 located equidistant from the saddle first planar surface 131 and saddle second planar surface 132, the longitudinal centerplane 125 is also parallel to the saddle first planar surface 131 and saddle second planar surface 132. Holes 123,124 are offset from the longitudinal centerplane 125 of the saddle to allow clearance for the adjustment tool from the guitar string. The saddle 122 also has an imaginary transverse centerplane 127 that is equidistant from the saddle right side 126 and saddle left side 134, and is orthogonal to the longitudinal centerplane 125. Peak 82 is offset from the transverse centerplane 127 of the saddle 122 to allow more intonation adjustment by installing the saddle in one of two orientations while keeping the overall saddle aligned between the wedge locks as much as possible.

Figure 41:
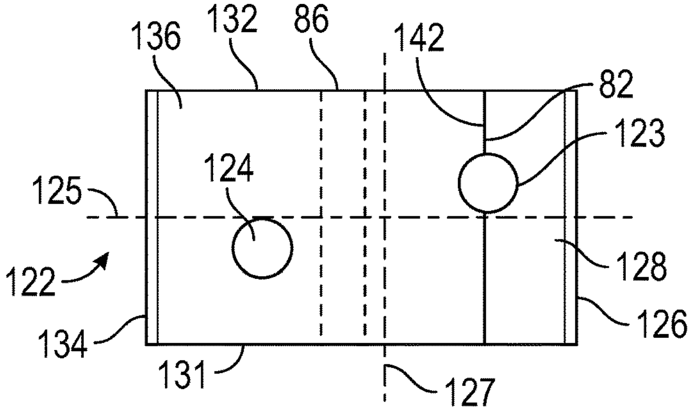
FIG. 41 is a top view of the saddle from FIG. 39.

FIG. 41 is a top view of the saddle 122.

Figure 42:
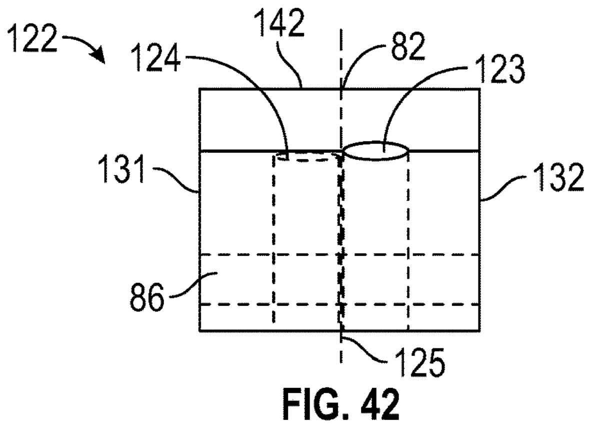
FIG. 42 is a side view of the saddle from FIG. 39.

FIG. 42 is a side view of the saddle 122.

Figure 43:
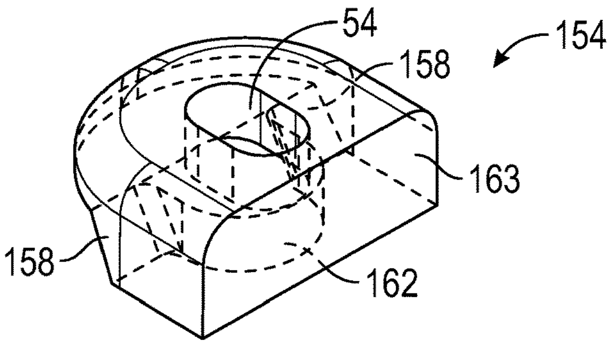
FIG. 43 is a perspective view of another embodiment of a wedge lock.
Figure 44:
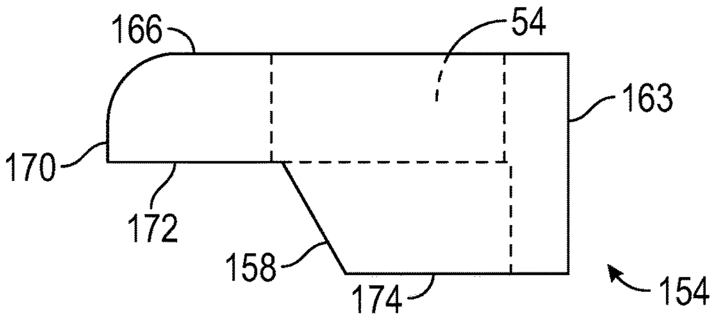
FIG. 44 is a front view of the wedge lock from FIG. 43.

FIG. 43 is a perspective view of another embodiment of a wedge lock 154. This wedge lock 154 has an angled surface 158 is configured to abut and mate against the first angled member 22 and the angled surface 102. The wedge lock 154 also has a volume 162 cut out or removed from the wedge lock 154 so that the wedge lock 154 can abut and mate against the angled surface 102 while still having space to accept the first bump out 98. The wedge lock screw hole 158 opens into the volume 162. The wedge lock 154 also has a vertical planar surface 163. The vertical planar surface 163 is configured to press against a saddle vertical planar surface 131, 132, and to lock the saddle in place due to the wedge effect of the wedge lock 154 with the angled surfaces 102, 110 of the first angled member 22 and second angled member 26 respectively FIG. 44 is a front view of the wedge lock 154. The wedge lock 154 has a top surface 166 that curves into a side surface 170. This curve makes the wedge lock 154 more comfortable for the guitar player when playing the guitar, as compared to sharp angles and edges. The side surface is generally orthogonal to the top surface 166. Abutting the side surface 170 is a first underside planar surface 172. The first underside planar surface 172 is parallel to the top surface 166. The first underside planar surface 172 abuts the angled surface 158. The angled surface 158 abuts a second underside planar surface 174. The second underside planar surface 174 may also be parallel to the top surface 166. The first underside planar surface 172 is configured to about and mate with the first planar surface 23 of the first angled member 22. The second underside planar member 174 is configured to abut to and mate with the first step planar surface 204 of the first angled member 22. Similarly, the first underside planar surface 172 is also configured to abut to and mate with the second planar surface 27 of the second angled member 26. Also, the second underside planar member 174 is configured to abut to and mate with the second step planar surface 212 of the second angled member 26.

Figure 45:
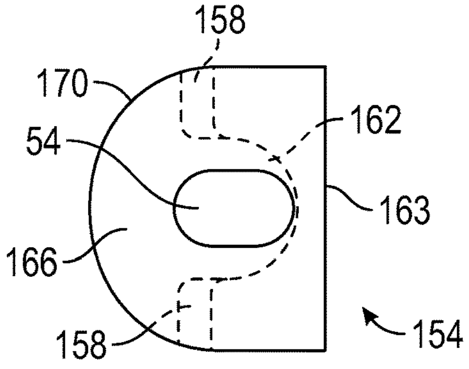
FIG. 45 is a top view of the wedge lock from FIG. 43.

FIG. 45 is a top view of the wedge lock 154.

Figure 46:
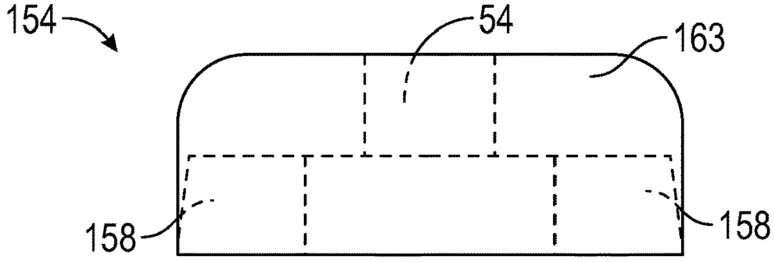
FIG. 46 is a side view of the wedge lock from FIG. 43.

FIG. 46 is a side view of the wedge lock 154.

Figure 47:
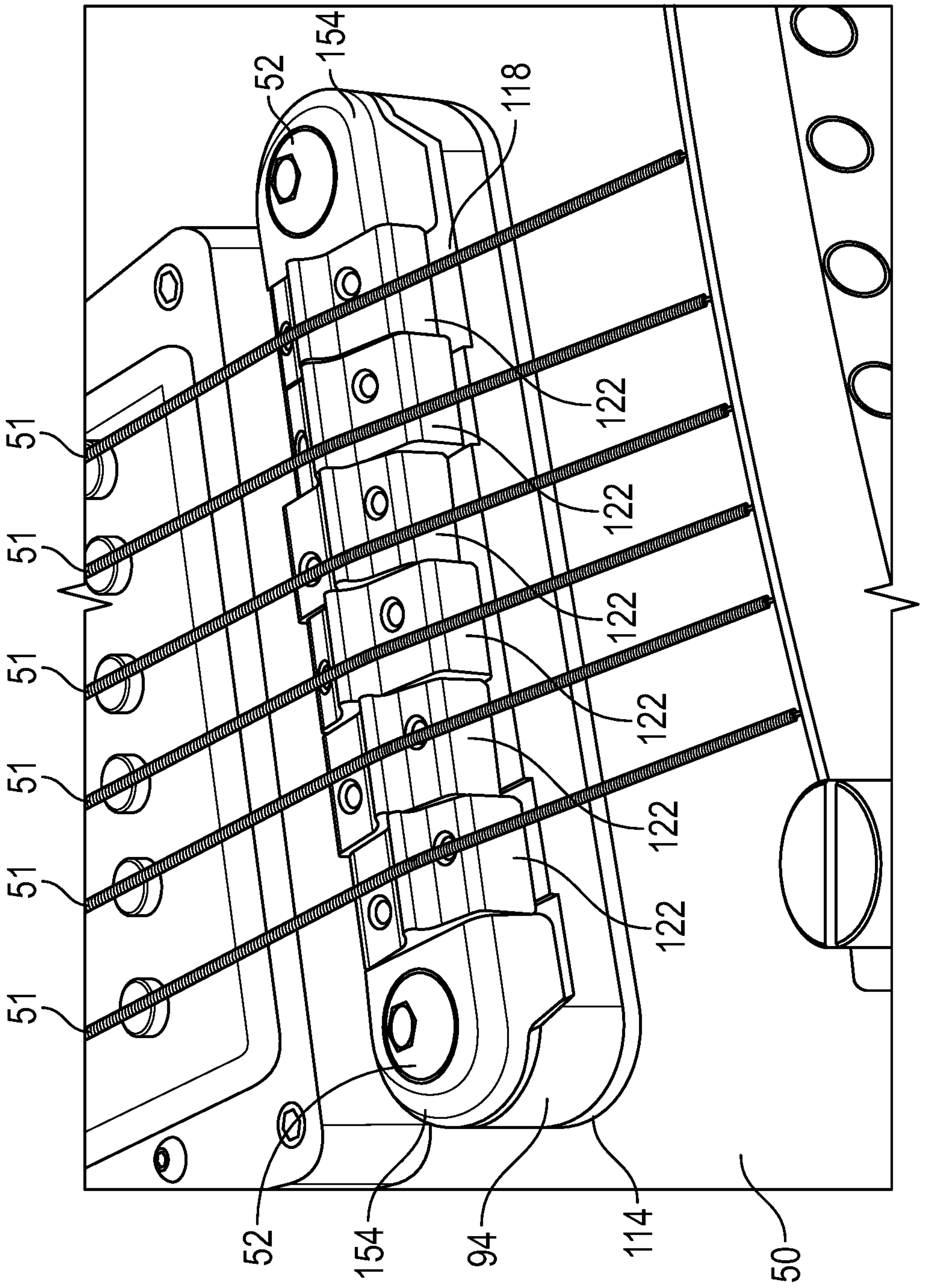
FIG. 47 is a perspective view of the embodiment of the stringed instrument bridge shown in FIGS. 27-46 installed on a guitar body with the guitar strings installed on the guitar.

FIG. 47 is a perspective view of the embodiment of the stringed instrument bridge shown in FIGS. 27-46 installed on a guitar body 50 with the guitar strings 51 installed on the guitar.

Figure 48:
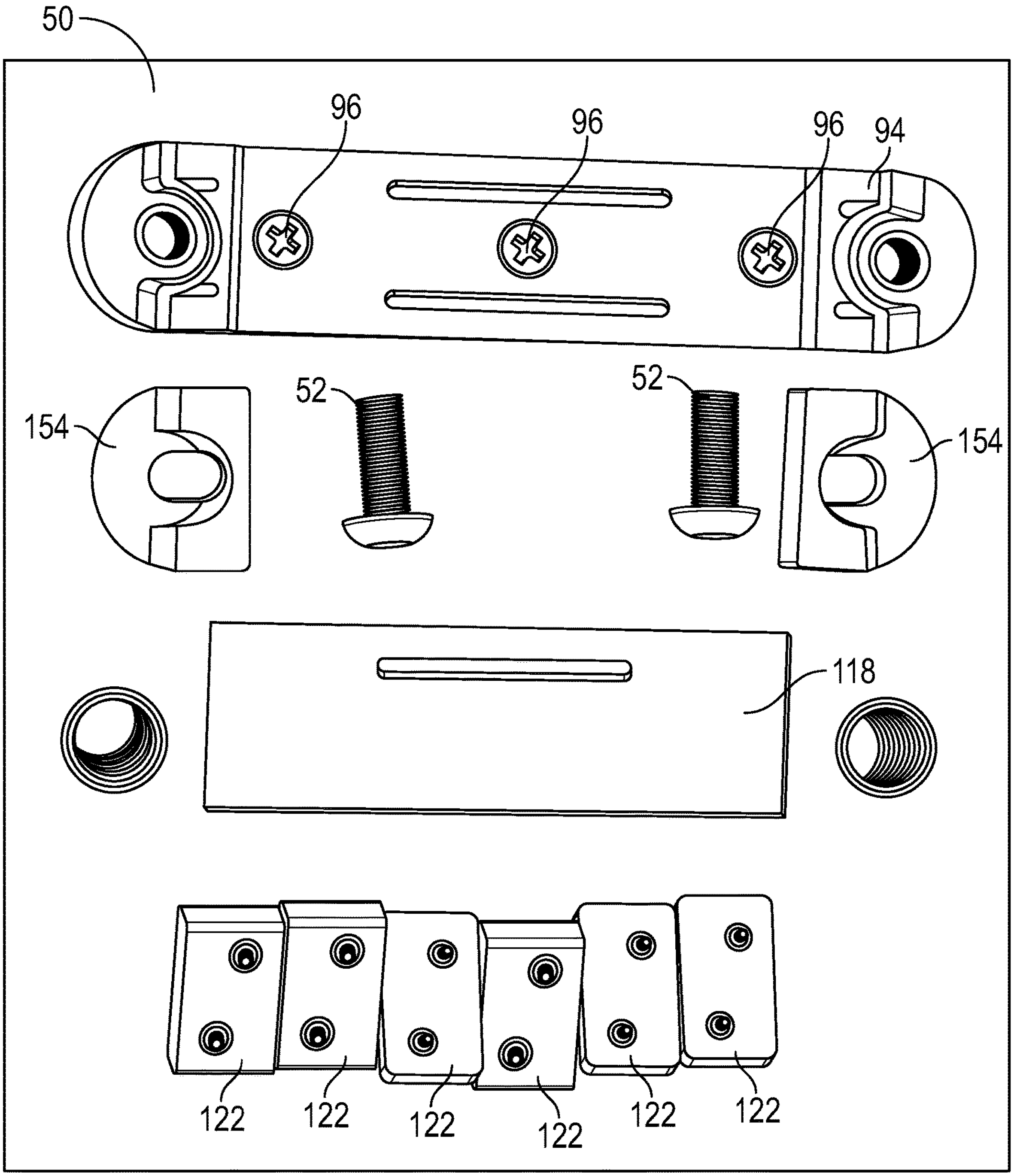
FIG. 48 is a perspective view showing some of the pieces that make up the stringed instrument bridge in FIG. 47.

FIG. 48 shows the pieces that make up the stringed instrument bridge in FIG. 47, except for the height spacer 114. Three screws 96 go through the three screw holes 95 to attach the bridge body 94 and spacer 114 to the guitar body 50.

Figure 49:
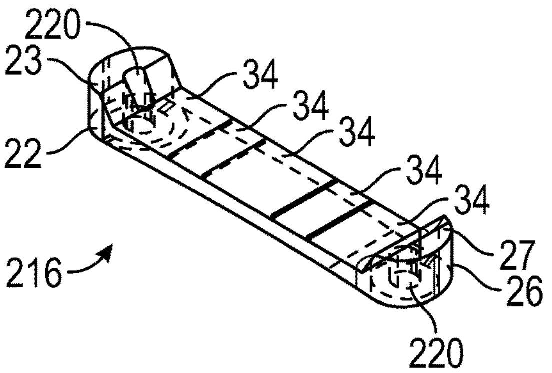
FIG. 49 is a perspective view of another embodiment of the bridge body.

FIG. 49 is a perspective view of another embodiment of the bridge body 216. In this embodiment, the bridge body 216 has an integral step block, not a separate step block 118 as shown in FIGS. 35-38. The bridge body has a plurality of steps 34. Abutting one of the steps is a first angled member 22. Abutting a step on the opposite side of the bridge body 216 is a second angled member 26. The first angled member 22 also has a first planar surface 23 that is parallel to the top surface of the steps 34. The first planar surface 23 is configured to abut and mate against a planar surface of the wedge lock 42, 46. The second angled member 26 also has a second planar surface 27 that is parallel to the top surface of the steps 34. The second planar surface 23 is configured to abut and mate against a planar surface of the wedge lock 42, 46. The bridge body may have two unthreaded screw holes 220. In this embodiment, the screws 52 (not shown in this view) are configured to slide through the screw holes 220, and screw into threaded holes on the guitar body (not shown in this figure). Holes 220 may be slotted screw holes to accommodate guitars with various threaded hole spacings.

Figure 50:
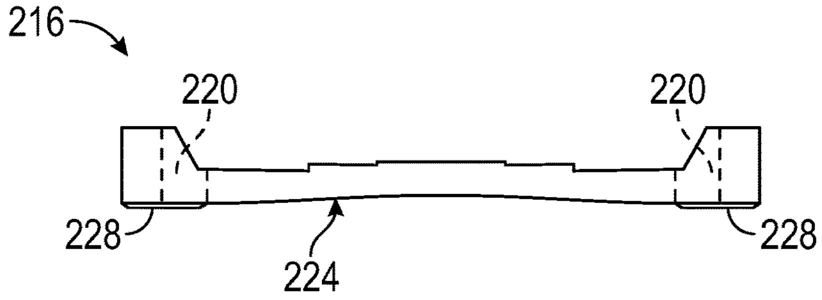
FIG. 50 is a front view of the bridge body from FIG. 49.

FIG. 50 is a front view of the bridge body 216. In this view, the underside 224 of the bridge body is shown with a curve. This curve on the underside 224 allows the bridge body 216 to fit onto curved top guitars. The underside 224 also has two built in washers/spacers 228. Other washer/spacer designs can be implemented to accommodate various guitar top configurations.

Figure 51:
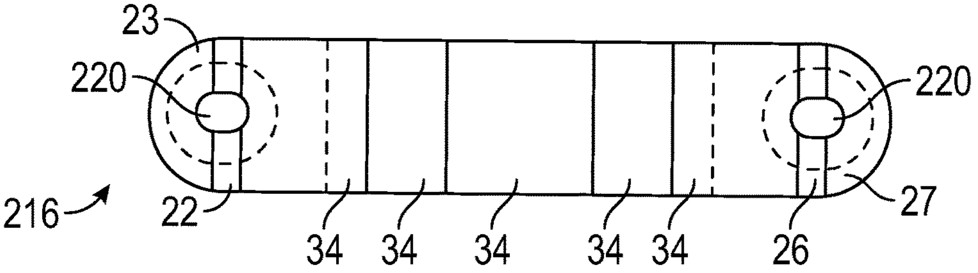
FIG. 51 is a top view of the bridge body from FIG. 49.

FIG. 51 is a top view of the bridge body 216.

Figure 52:
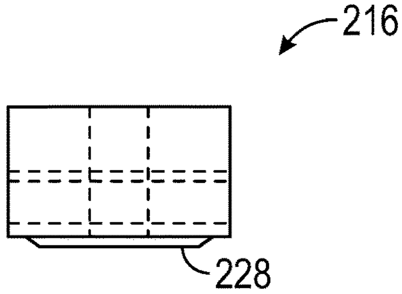
FIG. 52 is a side view of the bridge body from FIG. 49.

FIG. 52 is a side view of the bridge body 216. The embodiments of the bridge body 216 in FIGS. 49-52 are particularly suited for retrofitting guitars, and replacing their existing stringed instrument bridges.

Figure 53:
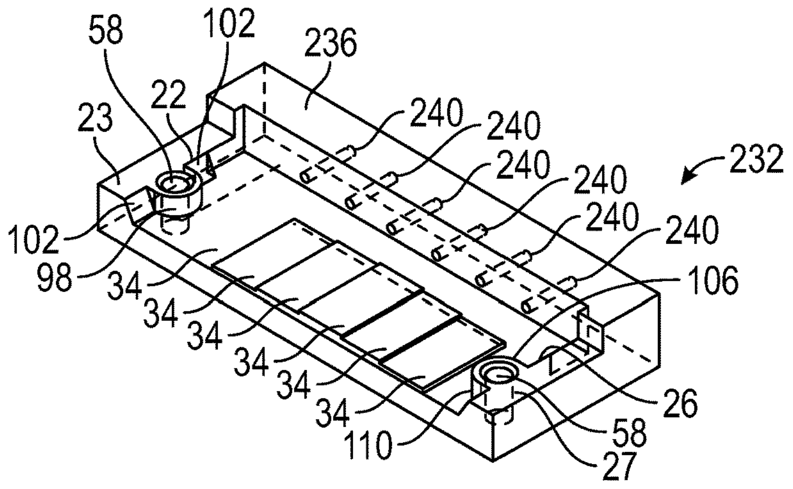
FIG. 53 is a perspective view of another embodiment of the bridge body.

FIG. 53 is a perspective view of another embodiment of the bridge body 232. In this embodiment, the bridge body 232 has an integral step block, not a separate step block 118 as shown in FIGS. 35-38. The bridge body has a plurality of steps 34. Abutting one of the steps is a first angled member 22. Abutting a step on the opposite side of the bridge body 216 is a second angled member 26. The first angled member 22 also has a first planar surface 23 that is parallel to the top surface of the steps 34. However, in this embodiment, the first angled member 22 has a first bump out 98 that generally encircles the bridge body screw hole 58 located in the first angled member 22 while at the same time maintaining the availability of a portion of the angled surface 102 of the first angled member 22 for a wedge lock 154 (wedge lock 154 is discussed above to abut and mate against. The bump out 98 allows for more threads in the bridge body screw hole 58 to make a stronger attachment with a screw 52. The first planar surface 23 is configured to abut and mate against a planar surface of the wedge lock 154. Similarly, the second angled member 26 has a second bump out 106 that generally encircles the bridge body screw hole 58 located in the second angled member 26 while at the same time maintaining the availability of a portion of the angled surface 110 of the second angled member 26 for a wedge lock 154 to abut and mate against. The bump out 106 allows for more threads in the bridge body screw hole 58 to make a stronger attachment with a screw 52. The second planar surface 23 is configured to abut and mate against a planar surface of the wedge lock 154. The bridge body 232 also has an integral tailpiece 236 that comprises 6 string holes 240. In this embodiment, instead of the stringed instrument having a separate tail piece to hold the ends of the strings, the bridge body 232 has an integral tail piece 236 that can hold the ends of the guitar strings. Each string hole 240 is aligned with one of the steps 34, and one of the saddles 122 which will be located on a respective step 34.

Figure 54:
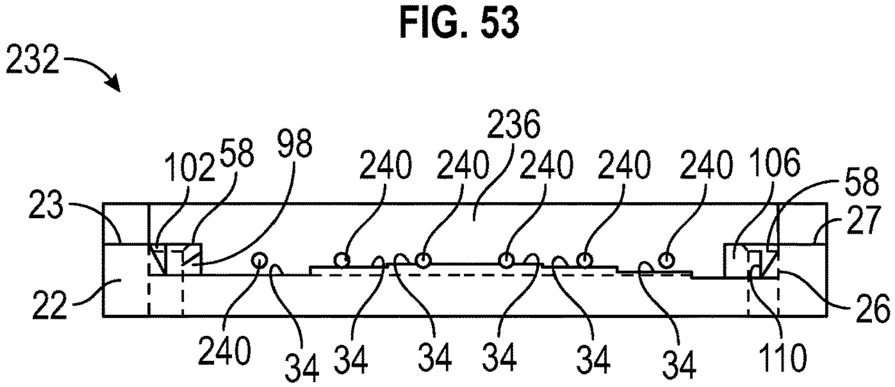
FIG. 54 is a front view of the bridge body from FIG. 53.

FIG. 54 is a front view of the bridge body 232.

Figure 55:
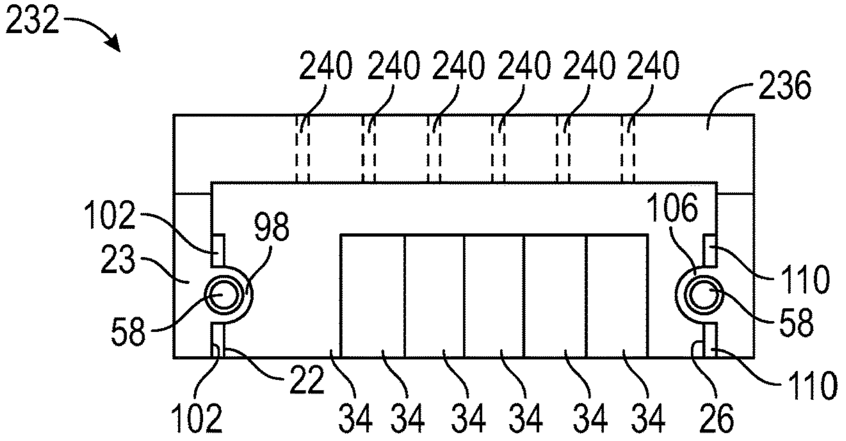
FIG. 55 is a top view of the bridge body from FIG. 53.

FIG. 55 is a top view of the bridge body 232.

Figure 56:
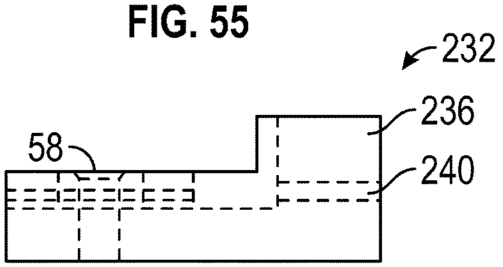
FIG. 56 is a side view of the bridge body from FIG. 53.

FIG. 56 is a side view of the bridge body 232.

Figure 57:
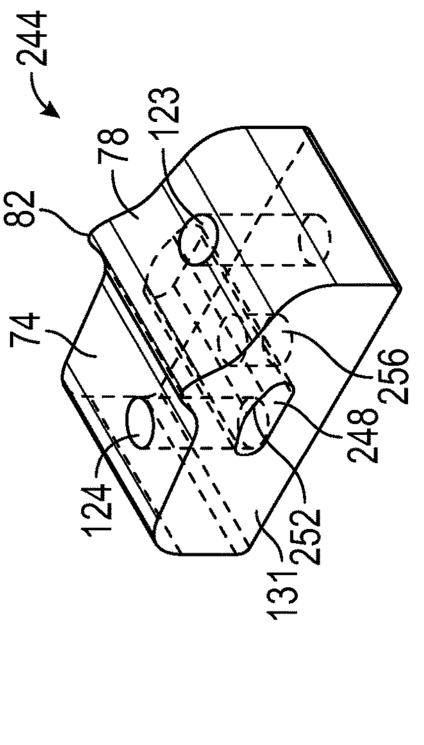
FIG. 57 is a perspective view another embodiment of the saddle.

FIG. 57 shows a perspective view another embodiment of a saddle 244. In this embodiment, the saddle 244 has a through hole 248 that is not a symmetrical hole/slot, but rather has a domed shaped top 252. The saddle 244 also has a threaded hole 256 from the bottom side 130 of the saddle 244 up to the through hole 248. A retention wire set screw (not shown) is configured to be screwed into the threaded hole 256 and tightened until the retention wire set screw holds a retention wire (not shown) up against the inside surface of the through hole 248 at the domed shaped top 252. The through hole 248 allows for freedom of movement in two axes for the individual saddles while still retaining the saddles. Two axes of movement are required for adjusting height and intonation. The through hole 248 is shaped with a dome at the top to help keep a retention wire centered over the retention wire set screw and to allow additional vertical movement of the saddles. In one embodiment, a retention wire set screw is installed only on the two end saddles even though the threaded hole may be present in all the saddles in a bridge. The retention wire can be any material such as steel, aluminum, or an elastic material, or a coated wire, soft steel wire, or craft wire.

Figure 58:
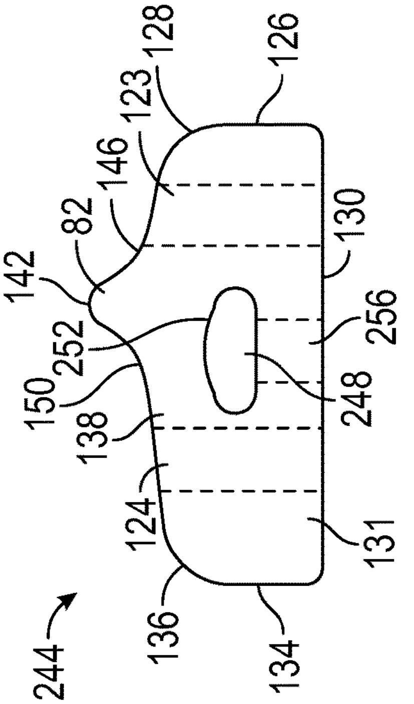
FIG. 58 is a front view of the saddle from FIG. 57.

FIG. 58 is a front view of the saddle 244 from FIG. 57.

Figure 59:
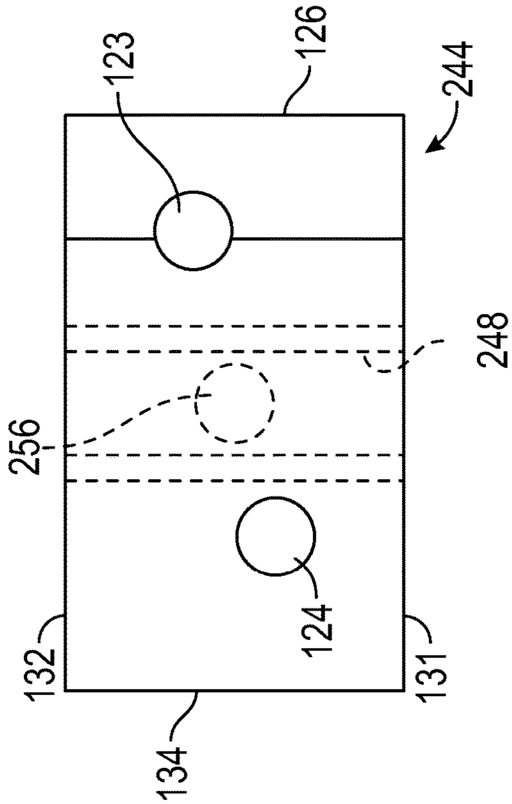
FIG. 59 is a top view of the saddle from FIG. 57.

FIG. 59 is a top view of the saddle 244 from FIG. 57.

Figure 60:
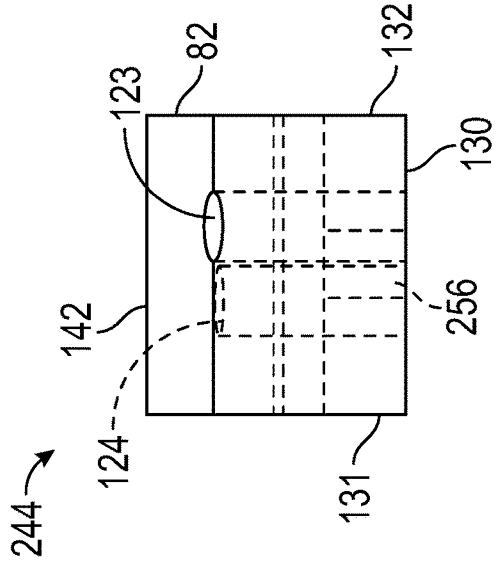
FIG. 60 is a side view of the saddle from FIG. 57.

FIG. 60 is a side view of the saddle 244 from FIG. 57.

Figure 61:
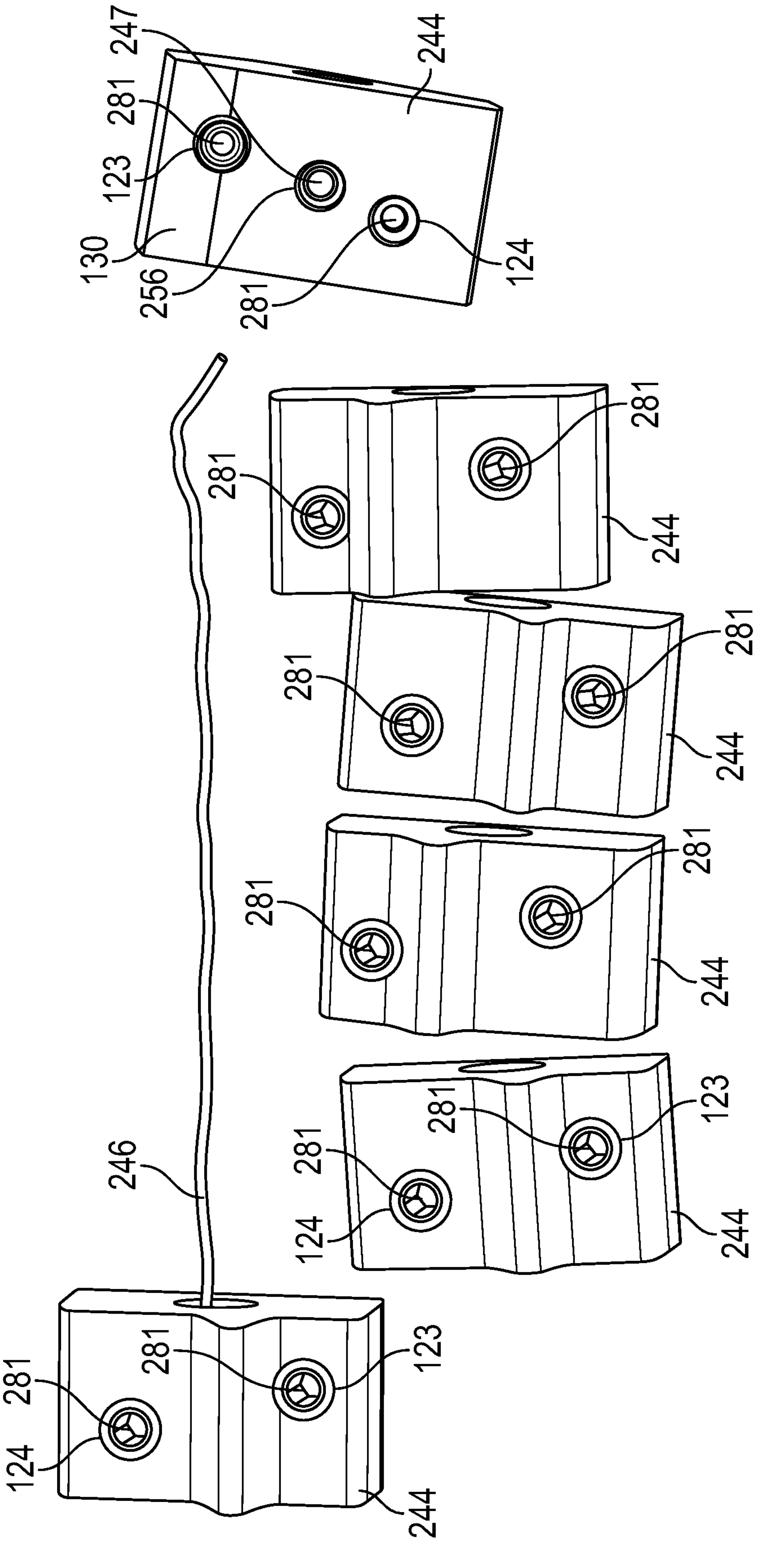
FIG. 61 is a top perspective view of six saddles with a retention wire.

FIG. 61 shows six saddles 244, with a retention wire 246 emanating from a through hole 248 of one of the saddles 244. A saddle 244 on the right side of FIG. 61 is flipped over to show the retention wire set screw 247 in the threaded hole 256. In addition, the saddle threaded holes 123, 124 all have height adjusting set screws 281 in them.

Figure 62:
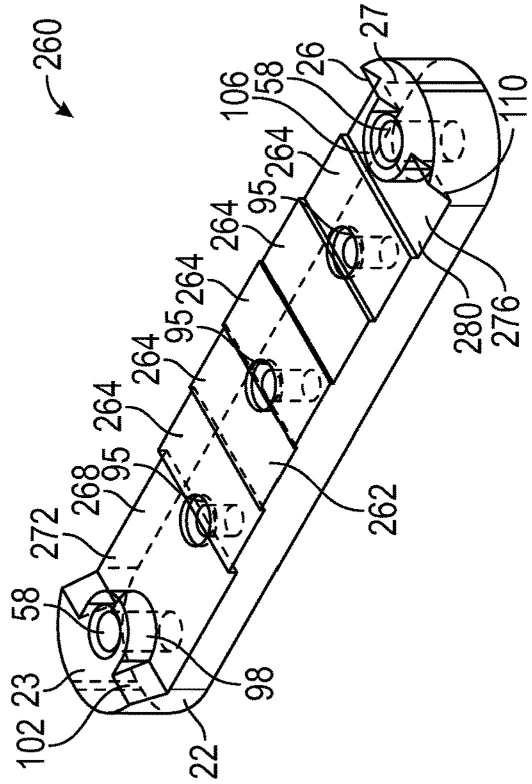
FIG. 62 is a perspective view another embodiment of the bridge body.

FIG. 62 is a perspective view another embodiment of the bridge body 260. In this embodiment, the bridge body 260 has an integral step block. The bridge body 260 has a receiving surface 262 comprising a plurality of steps 264. The receiving surface 262 has three screw holes 95. These screw holes 95 may be used to attach the bridge body 260 to the guitar body 50 (or other stringed instrument body) via screws. Abutting one side of the receiving surface 262 is a first angled member 22. Abutting the opposite side of the receiving surface 262 is a second angled member 26. However, in this embodiment, the first angled member 22 has a first bump out 98 that generally encircles the bridge body screw hole 58 located in the first angled member 22 while at the same time maintaining the availability of a portion of the angled surface 102 of the first angled member 22 for a wedge lock 154 to abut and mate against, see FIGS. 43-46. The bump out 98 allows for more threads in the bridge body screw hole 58 to make a stronger attachment with a screw 52. The first angled member 22 also has a first planar surface 23 that is parallel to the tops of the steps 264. The first planar surface 23 is configured to abut and mate against a planar surface of the wedge lock 154. The first angled member 22 also comprises a first step 268 that forms a first step planar surface 272 that is parallel to the tops of steps 264. The first step planar surface 272 may be configured to receive and mate with a planar surface on the wedge lock 154. Similarly, the second angled member 26 has a second bump out 106 that generally encircles the bridge body screw hole 58 located in the second angled member 26 while at the same time maintaining the availability of a portion of the angled surface 110 of the second angled member 26 for a wedge lock 154 to abut and mate against. The bump out 106 allows for more threads in the bridge body screw hole 58 to make a stronger attachment with a screw 52. In one embodiment the angled surfaces 102 and 106 may make an angle of about 60° with the tops of the steps 264. The second angled member 26 also has a second planar surface 27 that is parallel to the tops of the steps 264. The second planar surface 27 is configured to abut and mate against a planar surface of the wedge lock 154. The second angled member 26 also comprises a second step 276 that forms a second step planar surface 280 that is parallel to the tops of the steps 264. The second step planar surface 280 is configured to receive and mate with a planar surface on the wedge lock 154. We talk about the horizontal planer surfaces of the top of the bridge body abutting, receiving and/or mating with the horizontal planer surfaces of the underside of the wedge lock. These surfaces 272, 280, and tops of the steps 264 may only touch the planar surface on the wedge lock 154 if the wedge lock 154 is fully "bottomed out" or screwed all the way down. Many times, at least one wedge lock 154 will not be bottomed out because the wedge lock 154 is holding the saddles in place, and the wedge lock 154 may be above the surfaces 272, 280, and tops of the steps 264. Many times there will be a small gap between the bottom of the wedge lock 154 and the surfaces 272, 280, and tops of the steps 264 when everything is tightened down. This embodiment reduces the number of components, simplify the design, and increase manufacturability. The steps 264 are an advantage to maximize the ability to adjust the saddle heights with the height adjusting set screws. The steps 264 may be higher for larger strings. This embodiment may use the same wedge locks and saddles already discussed in this application.

Figure 63:
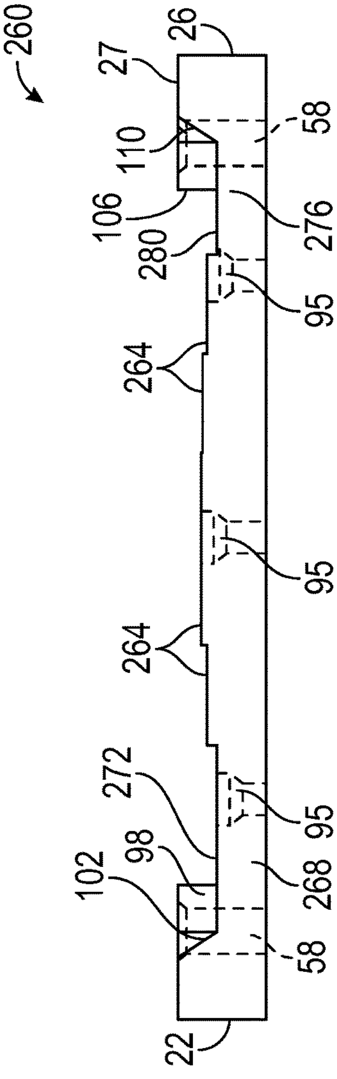
FIG. 63 is a front view of the bridge body from FIG. 62.

FIG. 63 is a front view of the bridge body 264 from FIG. 62.

Figure 64:
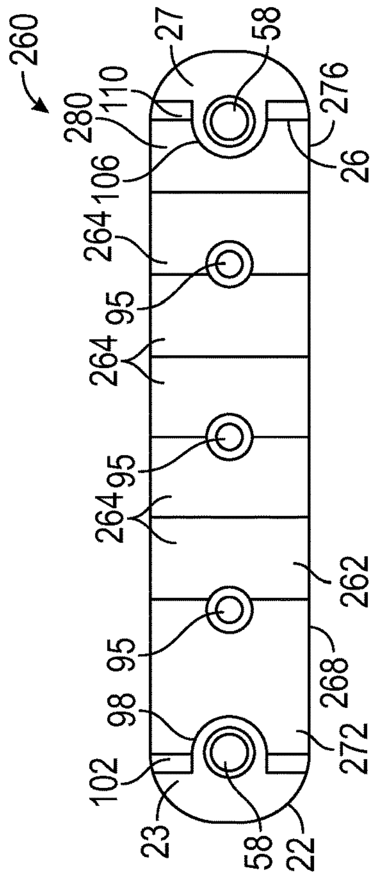
FIG. 64 is a top view of the bridge body from FIGS. 62 and 63.

FIG. 64 is a top view of the bridge body 264 from FIGS. 62 and 63.

Figure 65:
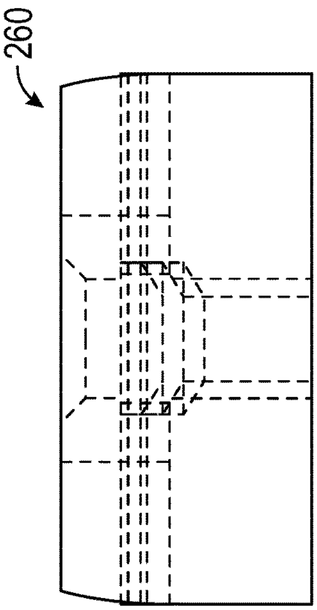
FIG. 65 is a side view of the bridge body 264 from FIGS. 62, 63, 64.

FIG. 65 is a side view of the bridge body 264 from FIGS. 62, 63, 64.

The stringed instrument bridge provides an intonatable stringed instrument bridge with the minimum use of components and hardware. The stringed instrument bridge uses a wedge lock system with two wedge locks that squeeze the saddles together to solidly and rigidly secure the saddles without the use of other hardware. Slightly loosening a wedge lock allows the saddles to be easily and quickly adjusted for intonation without the use of numerous adjustment screws, springs or other screw-based adjustment systems. The wedge lock system allows some lateral adjustment of the strings, but does not force the saddles and strings to one side as in the case of a set screw or a single wedge lock system. The string height and radius is set by the use of a solid "step block" that is installed under the saddles onto a location bar at the bottom of the bridge. This is the preferable method and provides for guitars of with differing neck radius and string heights based on player preferences. Optionally, two set screws can be installed into each saddle to make the height readily adjustable, but is not as solid as a custom built step block. The saddles can have a hole horizontally through them for the installation of a pipe cleaner or other cushioned wire to retain the saddles in case of string breakage and possible loose wedge locks. The result of using minimal hardware and components that tighten rigidly and solidly together while still allowing intonation and string height to be adjusted is significantly increased sustain, tone and clarity of the musical notes while minimizing extraneous noises. As with other inventions, various materials including metals (e.g., aluminum, brass, chrome plated metals, and other plated metals) can be used based on user preference regarding tone, weight, feel and color or manufacturing considerations. The stringed instrument bridge may be made out of variety materials, including but not limited to: aluminum 6061 stock on a CNC milling machine using Fusion 360 CAD/CAM software. There is no limitation on particular material or method of manufacture provided the material is strong enough for the stringed instrument bridge.

The disclosed stringed instrument bridge uses minimal parts mounted as rigidly as possible avoiding geometrically complicated parts and hardware. A bridge body with two wedge locks secured by one screw each is used to clamp any number of saddles (depending on number of strings) together. A step block is used under the saddles to set the string height and radius. The step block and base have locating bar to keep the step block in place but allow lateral movement. Optionally, the saddles can have two set screws installed to make the height "field" adjustable. A lower step block is still used in this case to increase overall adjustability due to the neck radius. Optionally, coated wire or other material can be put through the middle of the saddles to retain saddles in case of string breakage and loose wedge locks. The coating on the wire is present to prevent vibrations and the resulting extraneous noises.

The stringed instrument bridge may be retrofitted onto existing guitars. Thus, an embodiment of the stringed instrument bridge would be able to mount to existing guitars. The screws in the wedge locks may vary in length in order to thread into the existing mounts on the top of existing guitars rather than threading into the base of the bridge.

The disclosed stringed instrument bridge has many advantages. The stringed instrument bridge can be adapted to various stringed instruments, instruments with different number of strings, and various instrument configurations. The disclosed bridge can be incorporated into existing bridge and tailpiece designs. The disclosed bridge can be adapted to a curved surface as well as a flat surface. The stringed instrument bridge is easily manufactured and uses fewer parts. The stringed instrument bridge and saddles can be made from various materials and easily swapped out based on player preferences. The stringed instrument bridge is simple to install and adjust. The stringed instrument bridge may be retrofitted onto existing guitars. The guitar strings will be exposed as they lie over the saddles, allowing a user to mute the strings with his or her palm while playing. The stringed instrument bridge results in increased sustain, tone and clarity. The guitar strings can remain laterally aligned with the neck. The stringed instrument bridge can be made extra wide to accommodate additional intonation adjustment when required. The disclosed stringed instrument bridge can be incorporated into other bridge and tail piece designs. The smooth and curved surfaces on the wedge locks and saddles make the stringed instrument more comfortable to play. The bump outs on the angled members gives more threads in the screw holes to allow screws to better attach to the screw holes.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A stringed instrument bridge comprising:

a bridge body;

a receiving surface located on the bridge body;

a first angled member abutting a first side of the receiving surface, the first angled member having a first angled surface with a first threaded hole;

a second angled member abutting a second side of the receiving surface, the second side on an opposite side from the first side, the second angled member having a second angled surface with a second threaded hole;

a plurality of saddles, each saddle configured to sit the receiving surface;

a first wedge lock, the first wedge lock having a first slotted screw hole, the first wedge lock configured to attach to the bridge body at the first angled member via a first screw configured to engage the first slotted screw hole and the first threaded hole;

a second wedge lock, the second wedge lock having a second slotted screw hole, the second wedge lock configured to attach to the bridge body at the second angled member via a second screw configured to engage the second slotted screw hole and the second threaded hole;

wherein when the first and second wedge locks are loosely attached to the first and second angle members, the saddles may be adjusted into an adjusted position with respect to the receiving surface; and wherein when first screw is tightened and the second screw is tightened, the first and second wedge locks fixedly hold the saddles in the adjusted position.

2. The stringed instrument bridge of claim 1, wherein the first angled member further comprises:

a first planar surface that is parallel to the receiving surface, and abuts the first angled surface;

a first step planar surface that is parallel to the receiving surface, and abuts the first angled surface;

a first bump out that generally encircles the first threaded hole, such that the first threaded hole has threads that extends up beyond the first angled surface;

wherein the second angled member further comprises:

a second planar surface that is parallel to the receiving surface, and abuts the second angled surface;

a second step planar surface that is parallel to the receiving surface, and abuts the second angled surface;

a second bump out that generally encircles the second threaded hole, such that the second threaded hole has threads that extends up beyond the second angled surface;

wherein the first wedge lock further comprises:

a first wedge lock angled surface configured to abut and mate with either the first angled surface of the first angled member or second angled surface of the second angled member;

a volume removed to allow the first wedge lock to accept the first or second bump out without preventing the abutting and matting of the first wedge lock angled surface to either the first angled surface of the first angled member or second angled surface of the second angled member, and wherein the volume removed is in direct communication with the first slotted screw hole, wherein the second wedge lock further comprises:

a second wedge lock angled surface configured to abut and mate with either the first angled surface of the first angled member or second angled surface of the second angled member; and a volume removed to allow the second wedge lock to accept the first or second bump out without preventing the abutting and matting of the second wedge lock angled surface to either the first angled surface of the first angled member or second angled surface of the second angled member, and wherein the volume removed is in direct communication with the second slotted screw hole.

3. The stringed instrument bridge of claim 1, wherein the receiving surface comprises six steps, and the plurality of saddles comprise six saddles, one saddle configured for each of the six steps.

4. The stringed instrument bridge of claim 1, wherein each saddle further comprises:

a first vertical planar surface;

a second vertical planar surface on a side of the saddle opposite the first vertical planar surface;

a right side in between both and abutting both the first vertical planar surface and second planar surface;

a left side in between both and abutting both the first vertical planar surface and second planar surface;

an imaginary longitudinal centerplane located equidistant from the first vertical planar surface and the second vertical planar surface, the longitudinal centerplane parallel to the first vertical planar surface and the second vertical planar surface;

an imaginary transverse centerplane located equidistant from the right side and the left side, the transverse centerplane orthogonal to the longitudinal centerplane;

a bottom side in between both and abutting both the first vertical planar surface and second planar surface;

a top side in between both and abutting both the first vertical planar surface and second planar surface;

a peak located offset from the transverse centerplane on the top side, where the top of the peak is a curved surface;

a first curved surface at the intersection of the top side and the right side;

a second curved surface at the intersection of the top side and the left side;

a first peaked curved surface on a first side of the peak at one intersection of the peak and the top side, a second peaked curved surface on a second side of the peak at a second intersection of the peak and the top side, wherein the second side is on an opposite side of the peak from the first side;

wherein the first curved surface, second curved surface, peak curved surface, first peaked curved surface, and second peak curved surface are configured to present a comfortable curved surface to a user of a stringed instrument that has the stringed instrument bridge installed on it.

5. The stringed instrument bridge of claim 4, wherein each saddle further comprises:

a first threaded hole extending from the bottom side to the top curved surface on the first side of the peak;

a second threaded hole extending from the bottom side to the top curved surface on the second side of the peak;

the first threaded hole and the second threaded hole are both offset from the longitudinal centerplane and configured to allow tool clearance from and instrument string; and an unthreaded through hole from the first vertical planar surface to the second vertical planar surface, the unthreaded through hole having a domed shape;

a retention wire threaded hole extending from the bottom side up into the bottom surface of the unthreaded through hole;

a retention wire set screw configured to screw into the retention wire threaded hole and further configured to impinge a retention wire against the top surface of the unthreaded through hole; and the domed shape configured to center a retention wire over a retention wire set screw.

6. The stringed instrument bridge of claim 5, wherein the domed shape is comprised by the top surface of the unthreaded through hole and the bottom surface of the unthreaded through hole, the top surface being concave, and the bottom surface having a generally flat horizontal surface.

7. A saddle for a stringed instrument bridge, the saddle comprising:

a first threaded hole extending from the bottom side to the top curved surface on the first side of the peak;

a second threaded hole extending from the bottom side to the top curved surface on the second side of the peak;

the first threaded hole and the second threaded hole are both offset from the longitudinal centerplane and configured to allow tool clearance from and instrument string; and an unthreaded through hole from the first vertical planar surface to the second vertical planar surface, the unthreaded through hole having a domed shape;

a retention wire threaded hole extending from the bottom side up into the bottom surface of the unthreaded through hole;

a retention wire set screw configured to screw into the retention wire threaded hole and further configured to impinge a retention wire against the top surface of the unthreaded through hole; and the domed shape configured to center a retention wire over a retention wire set screw.

8. The saddle of claim 7, wherein the domed shape is comprised by the top surface of the unthreaded through hole and the bottom surface of the unthreaded through hole, the top surface being concave, and the bottom surface having a generally flat horizontal surface.

* * * * *